United States Patent
DuHamel

(10) Patent No.: US 7,245,039 B2
(45) Date of Patent: Jul. 17, 2007

(54) APPARATUS AND METHOD FOR GENERATING HYDROGEN GAS THROUGH THE USE OF WIND POWER

(76) Inventor: Robert A. DuHamel, 20011 Eastside Dr., Osakis, MN (US) 56360-4876

( * ) Notice: Subject to any disclaimer, the term of this patent is extended or adjusted under 35 U.S.C. 154(b) by 70 days.

(21) Appl. No.: 11/298,395

(22) Filed: Dec. 8, 2005

(65) Prior Publication Data

US 2006/0125241 A1    Jun. 15, 2006

Related U.S. Application Data

(60) Provisional application No. 60/635,139, filed on Dec. 10, 2004.

(51) Int. Cl.
*H02P 9/04* (2006.01)
*F03D 7/04* (2006.01)

(52) U.S. Cl. .............................. 290/44; 290/55; 416/17

(58) Field of Classification Search .................. 290/43, 290/44, 54, 55; 416/17, 108, 112
See application file for complete search history.

(56) References Cited

U.S. PATENT DOCUMENTS

| | | |
|---|---|---|
| 1,582,361 A | 4/1926 | Welsch |
| 3,484,617 A | 12/1969 | Winsel |
| 3,793,530 A | 2/1974 | Carter |
| 3,877,836 A | 4/1975 | Tompkins |
| 4,009,535 A | 3/1977 | Stock |
| 4,052,134 A | 10/1977 | Rumsey |
| 4,055,950 A | 11/1977 | Grossman |
| 4,058,979 A | 11/1977 | Germain |
| 4,180,367 A | 12/1979 | Drees |
| 4,236,866 A * | 12/1980 | Zapata Martinez .......... 415/4.4 |
| 4,274,809 A | 6/1981 | Delgado et al. |
| 4,299,537 A | 11/1981 | Evans |
| 4,334,823 A | 6/1982 | Sharp |
| 4,368,392 A | 1/1983 | Drees |

(Continued)

OTHER PUBLICATIONS

Crea, Dominic, "Twenty Hydrogen Myths—A physicists review", Web address: http://www.hydrogennews.org/hydrogen/crea.htm, (Apr. 16, 2004).

(Continued)

*Primary Examiner*—Nicholas Ponomarenko
(74) *Attorney, Agent, or Firm*—Charles A. Lemaire; Lemaire Patent Law Firm, P.L.L.C.

(57) ABSTRACT

This invention teaches an apparatus, method, means, and computer readable media to address the problem of the inconsistent, unreliable nature of wind, and in particular low-wind speeds, through utilizing a blower and/or startup assist to aid in turning an electricity generating electrical generator during periods of low-wind speed. This generator provides electrical power for an electrolyzer used to generate hydrogen gas from water. Some embodiments include wind speed and direction sensors and control programming and/or circuitry that tracks trends in direction and speed, and anticipate the need to move the direction of the wind-collecting funnel to best take wind into the funnel, and to provide a start-up assist to the wind-powered turbine at a wind speed that is lower than could start rotation of the turbine without assist, or to maintain rotation when the wind temporarily slows below the speed needed to maintain rotation.

20 Claims, 15 Drawing Sheets

U.S. PATENT DOCUMENTS

| | | | |
|---|---|---|---|
| 4,452,568 A | | 6/1984 | Andersson |
| 4,490,981 A | | 1/1985 | Meckler |
| 4,566,854 A | | 1/1986 | Slezak |
| 4,718,821 A | | 1/1988 | Clancy |
| 4,751,486 A | | 6/1988 | Minato |
| 4,776,171 A | * | 10/1988 | Perry et al. .................... 60/698 |
| 4,838,757 A | | 6/1989 | Benesh |
| 4,841,731 A | | 6/1989 | Tindell |
| 4,857,753 A | * | 8/1989 | Mewburn-Crook et al. ... 290/55 |
| 5,009,569 A | | 4/1991 | Hector, Sr. et al. |
| 5,133,637 A | * | 7/1992 | Wadsworth ................ 415/4.4 |
| 5,171,127 A | | 12/1992 | Feldman et al. |
| 5,350,273 A | | 9/1994 | Hector, Sr. et al. |
| 5,439,531 A | | 8/1995 | Finkl |
| 6,083,382 A | * | 7/2000 | Bird .......................... 210/96.2 |
| 6,100,600 A | * | 8/2000 | Pflanz ........................ 290/54 |
| 6,239,507 B1 | | 5/2001 | Douthit |
| 6,417,578 B1 | | 7/2002 | Chapman et al. |
| 6,457,671 B1 | | 10/2002 | Sherman |
| 6,756,696 B2 | | 6/2004 | Ohya et al. |
| 6,840,738 B1 | * | 1/2005 | Swanberg .................... 416/17 |
| 6,841,893 B2 | * | 1/2005 | Maiwald et al. .............. 290/43 |
| 6,984,899 B1 | * | 1/2006 | Rice ........................... 290/44 |

OTHER PUBLICATIONS

Lovins, Amory B., "Twenty Hydrogen Myths", Rocky Mountain Institute web address: http://www.rmi.org/images/other/Energy/E03-05_20HydrogenMyths.pdf, (Jun. 20, 2003).

Pratt, Will , "A Preliminary Investigation of two Small-scale, Autonomous Wind-hydrogen Systems", National Renewable Energy Laboratory web address: http://mfnl.xjtu.edu.cn/gov-doe-nrel/education/trac/pdfs/w_pratt.pdf, (Aug. 2002).

* cited by examiner

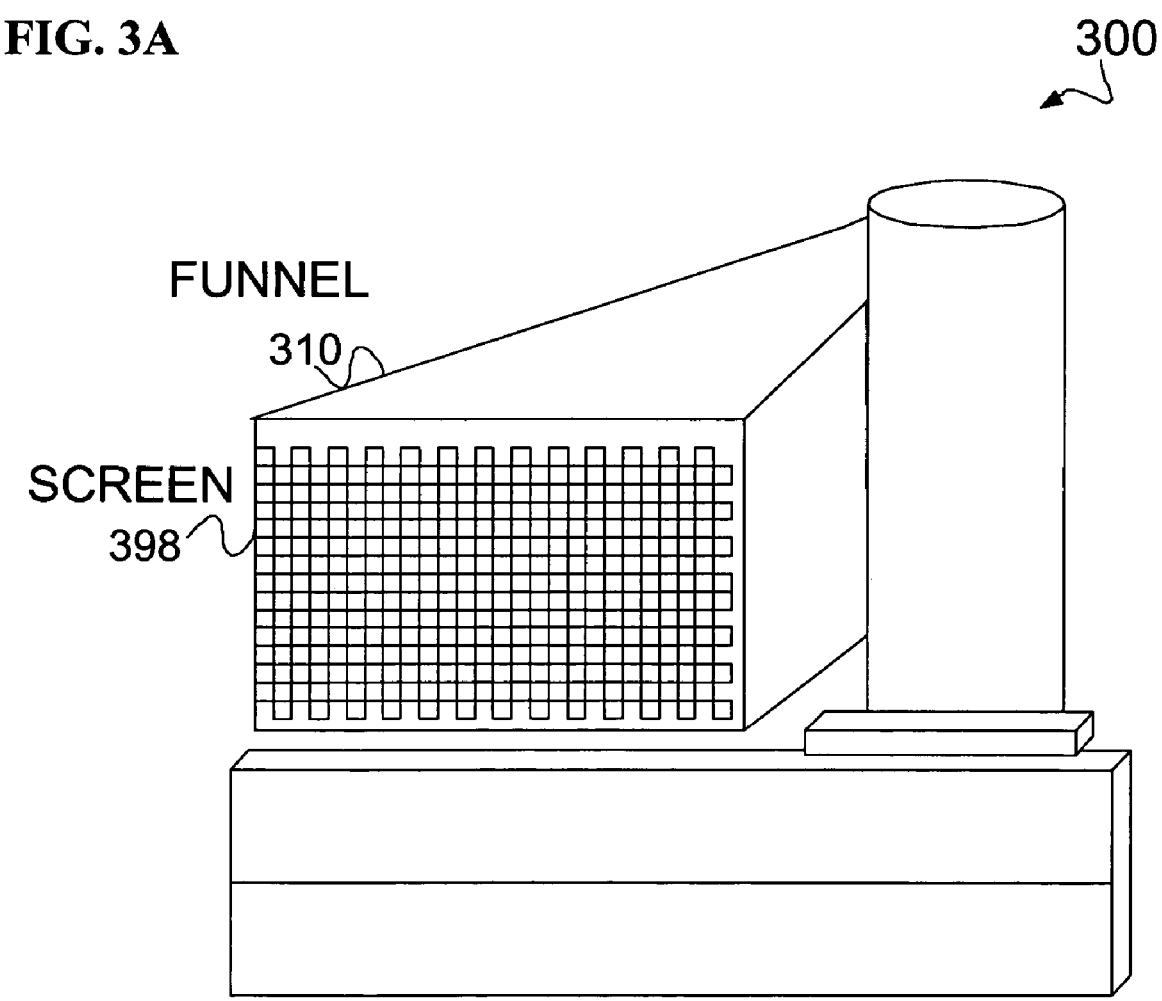

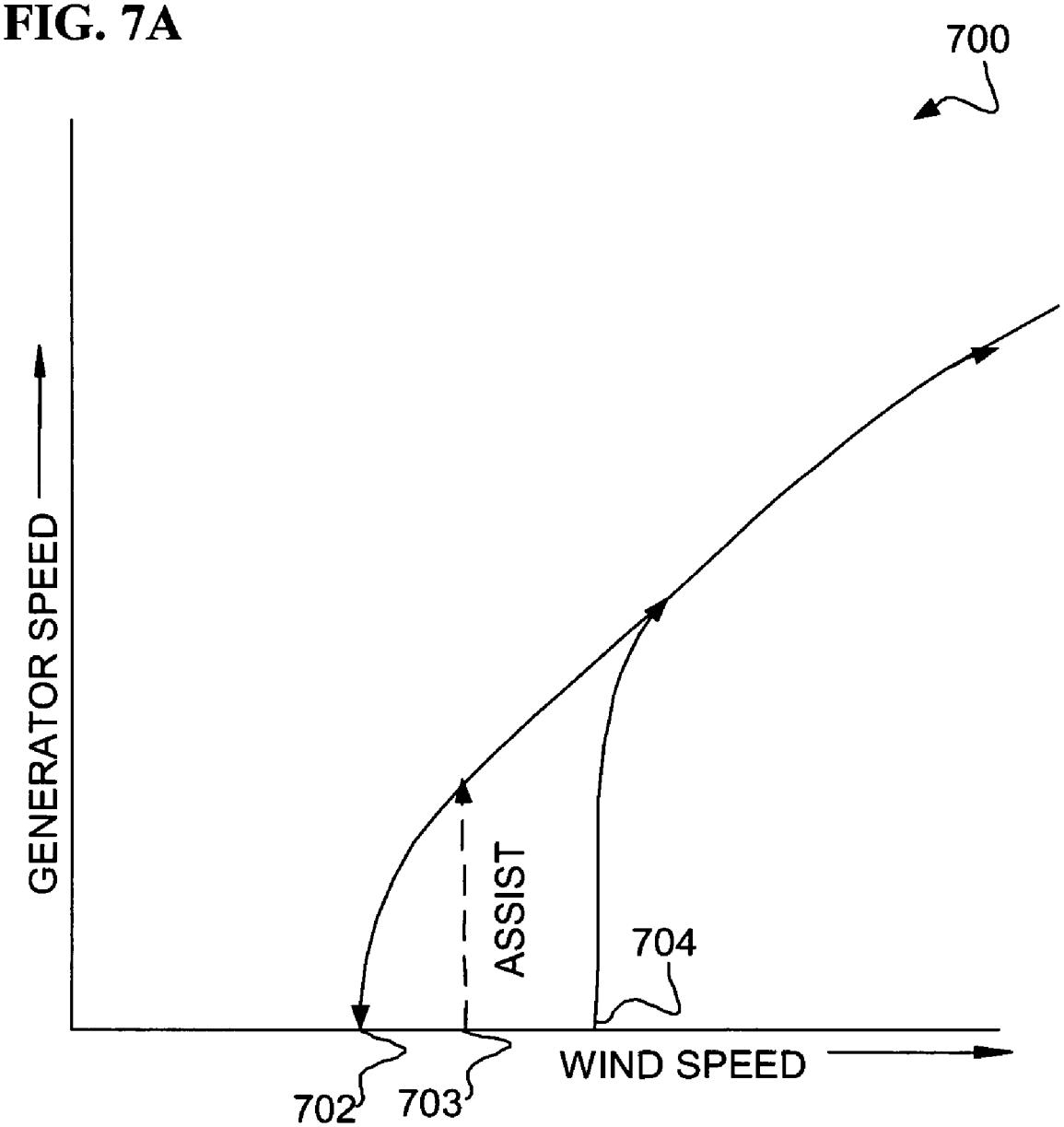

APPARATUS AND METHOD FOR GENERATING HYDROGEN GAS THROUGH THE USE OF WIND POWER

CROSS-REFERENCE TO RELATED APPLICATIONS

This invention claims benefit of U.S. Provisional Patent Application 60/635,139 filed on Dec. 10, 2004, titled "AN APPARATUS AND METHOD FOR GENERATING HYDROGEN GAS THROUGH THE USE OF WIND POWER", which is hereby incorporated by reference in its entirety.

FIELD OF THE INVENTION

The present invention relates to the field of electro-mechanical apparatus and methods for generating hydrogen gas through the use of wind power, and more particularly wherein electricity generated through wind power is used to separate out hydrogen and oxygen from water using an electrolyzer.

BACKGROUND OF THE INVENTION

Presently, most modern economies are dependant upon fossil fuels and the benefits that they provide in allowing for the generation of power. One problem with fossil fuels, however, is that they are a non-renewable resource. Additionally, they tend to generate pollutants such as carbon dioxide, nitrous oxides, sulfur dioxide, carbon monoxide and other toxic substances.

A solution to the non-renewable, polluting nature of fossil fuel use is to utilize technologies that allow for the generation of electrical power through renewable, non-polluting means. Two such technologies are wind power and hydrogen gas generated using other than fossil fuels.

Wind power used to generate electrical power is typically realized in the form of a wind-collection device used to capture the kinetic energy of wind via, for example, blades affixed to a horizontal or vertical axis or a turbine, coupled to a generator which then generates electrical current. This generator, and the electrical current that it generates, is then incorporated into an electrical power grid to supplement more traditional fossil-fuel-based generators of electrical power.

Like wind power, hydrogen gas from other than fossil fuel is a renewable resource that does not pollute the environment. One of the most abundant sources of hydrogen gas is water. Hydrogen gas can be liberated from water through the use of electrolysis. Once liberated, this hydrogen gas can be stored for future use in such things as running a power plant to generating electricity.

One problem with wind power as a basis from which to supply the electricity needed for electrolysis is that like the wind, wind power is an inherently unreliable, inconsistent form of power. An upshot of this unreliable, inconsistent nature is that power grids have problems synchronizing with wind-power based electrical generators. Various inventions through the years have sought to solve this problem by creating more efficient electrical generators that function at all wind speeds including low-wind speeds.

BRIEF SUMMARY OF THE INVENTION

The present invention provides an all-in-one wind-powered hydrogen generation and storage apparatus and method.

In some embodiments, the present invention addresses the problem of the inconsistent, unreliable nature of wind, and in particular low-wind speeds, by utilizing a blower and/or startup assist to turn an electricity-generating generator during periods of low-wind speed. The electrical power for this blower and/or startup assist is derived from either an optional external power source, or one or more stored batteries. Where the one or more batteries are used, these batteries are, in turn, recharged by the wind powered electrical generator during periods of moderate to high wind. Thus, for example, when the available wind speed is below that required to turn the electrical generator (i.e. below the "generation threshold"), the blower and/or startup assist can be utilized to assist the existing wind in turning the electrical generator for the purpose of generating electricity for an electrolyzer.

Some embodiments of the present invention are drawn to an apparatus including: at least one wind-powered electric generator, an electrolyzer coupled to receive electric power from the generator and operable to produce hydrogen using the electric power, a startup-assist mechanism operably coupled to deliver a startup assist to the generator, a wind-speed sensor operable to generate a speed signal based on a sensed wind speed, a status controller coupled to the startup-assist mechanism and operable to start the generator based upon the speed signal, a wind-direction sensor operable to generate a direction signal based upon a sensed wind direction, a rotation mechanism coupled to point the generator in a compass direction, and a rotation controller coupled to the rotation mechanism and operable to point the generator based upon the direction signal.

In addition to the above disclosed apparatus, some embodiments of the present invention provide a method whereby wind-direction information is received into a direction controller, based upon the wind-direction information, generating with the direction controller a direction-control signal, changing an orientation of a wind-collection device based upon the direction-control signal, and generating hydrogen from electric current, the current from a generator that is rotated by wind power derived from the wind-collection device.

Further, in some embodiments the present invention provides a computer-readable media having executable instructions stored thereon for causing a suitably programmed information-processing-and-hydrogen-generating apparatus to perform a method that includes: receiving wind-direction information, based upon the wind-direction information, generating a direction-control signal, changing an orientation of a wind-collection device based upon the direction-control signal, and generating hydrogen from electric current, the current from a generator that is rotated by wind power derived from the wind-collection device.

In still further embodiments, a kit is available from which to build an apparatus. This kit includes: a funnel component, a blower/startup assist component, solar-powered photo electric cells component, a generator/turbine component, a rotation mechanism component, a connection to an internet component, a wind speed sensor component, a wind direction sensor component, a startup controller component, a rotation controller component, an inverter component, a status controller component, a battery charge controller component, one or more batteries component, a detector component, a distiller component, an electrolyzer component, an electrolyzer controller component, a compressor component, a tank component to hold hydrogen gas, and a tank component to hold oxygen gas. In some embodiments, the kit further includes parts necessary to assemble the components of the kit.

BRIEF DESCRIPTION OF THE DRAWINGS

FIG. 3A is a block diagram of a system 300 showing a screen 398 covering an air inlet for a funnel 310.

FIG. 7A is another example of a graph 700 comparing wind speed as a function of generator speed with a point 702 as a wind speed below the generation threshold, and a point 703 as a point illustrating a wind speed at the generation threshold, and a point 704 above the generation threshold.

DETAILED DESCRIPTION OF THE INVENTION

Figure 1:
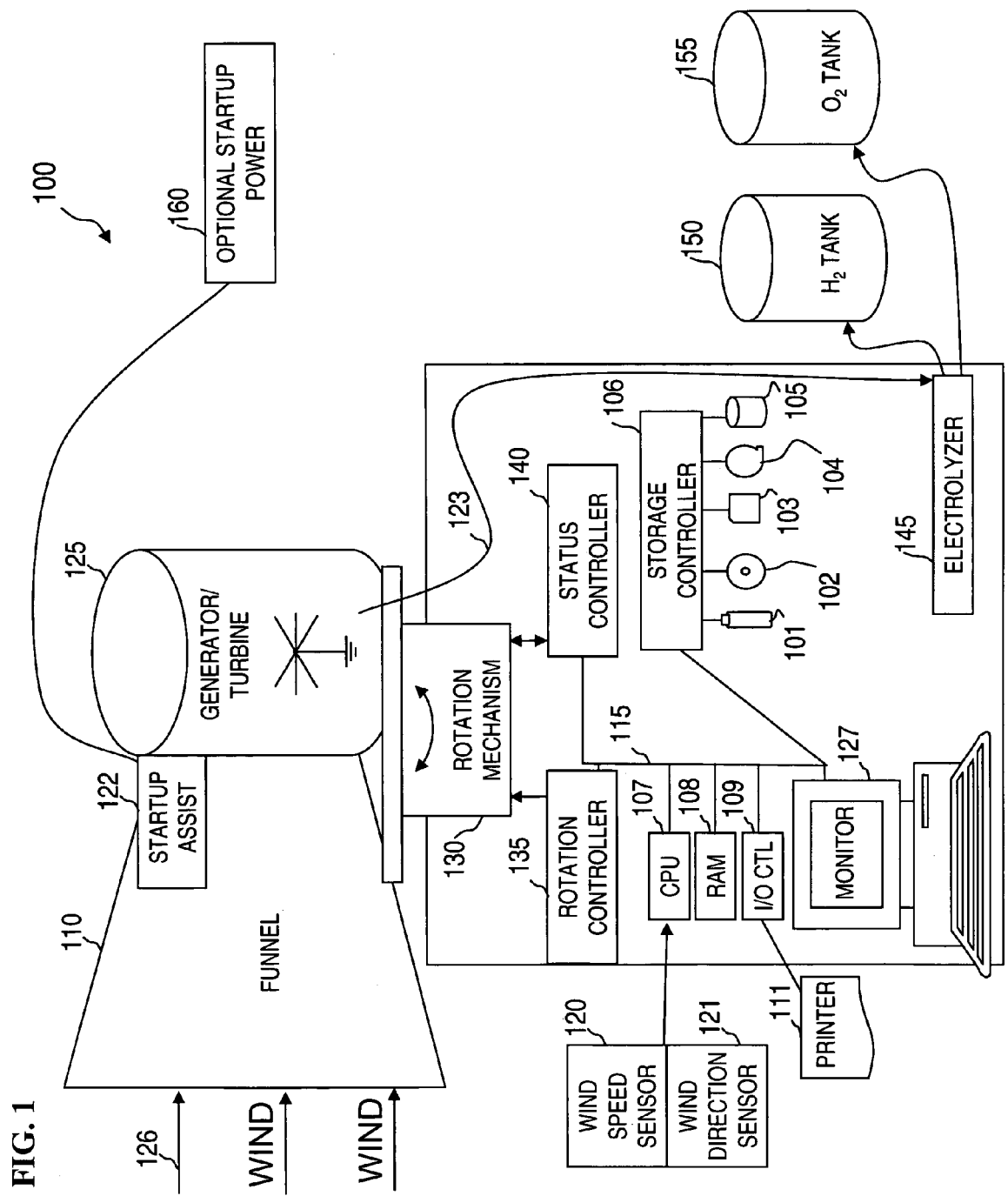
FIG. 1 is a block diagram of a system 100 showing one embodiment of the present invention having among other things a computerized system 100 with among a related CPU 107, RAM 108 and a variety of buses 115.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, a digital processing system or computer system is implemented that includes a processor, which may represent one or more processors and may include one or more conventional types of such processors (e.g., 68000 series, x86-64, x86), such as a Motorola, AMD, or Intel Pentium processor or the like. In some embodiments, the CPU is a single core machine, whereas in other embodiments the machine contains more than one processing core. A memory is coupled to the processor by a bus. The memory may be a dynamic random access memory (DRAM) and/or may include static RAM (SRAM). The processor may also be coupled to other types of storage areas/memories (e.g., cache, Flash memory, disk, etc.), which could be considered as part of the memory or separate from the memory.

The bus further couples the processor to a display controller, a mass memory or some type of computer-readable media device, the modem or network interface, and an input/output (I/O) controller. Computer-readable media may include a magnetic, optical, magneto-optical, tape, and/or other type of machine-readable media/device for storing information. For example, the computer-readable media may represent a hard disk, a read-only or writeable optical CD, etc. The display controller controls in a conventional manner a display, which may represent a cathode ray tube (CRT) display, a liquid crystal display (LCD), a plasma display, or other type of display device. The I/O controller controls I/O device(s), which may include one or more keyboards, mouse/trackball or other pointing devices, magnetic and/or optical disk drives, printers, scanners, digital cameras, microphones, etc.

In some embodiments, the present invention may be implemented entirely in executable computer program instructions which are stored on a computer-readable media or may be implemented in a combination of software and hardware, or in certain embodiments, entirely in hardware.

Embodiments within the scope of the present invention include computer-readable media for carrying or having computer-executable instructions or data structures stored thereon. In some embodiments, these instructions are written in an object oriented programming language such as C++, Java™, or Delphi™, and compiled or interpreted into some type of machine readable format such as binary code, byte code or the like. And again, in some embodiments, these instructions are written in a structured programming language such as C and compiled or interpreted into some type of machine readable format such as binary code. Such computer-readable media may be any available media, which is accessible by a general-purpose or special-purpose computer system. By way of example, and not limitation, such computer-readable media can comprise physical storage media such as RAM, ROM, EPROM, CD-ROM or other optical-disk storage, magnetic-disk storage or other magnetic-storage devices, or any other media which can be used to carry or store desired program code means in the form of computer-executable instructions, computer-readable instructions, or data structures and which may be accessed by a general-purpose or special-purpose computer system. This physical storage media may be fixed to the computer system as in the case of a magnetic drive or removable as in the case of an EEPROM device (e.g., flash memory device).

FIG. 1 is a block diagram of a system 100, one embodiment of the present invention that includes at least one wind-powered electric generator 125, an electrolyzer 145 coupled to receive electric power from the generator 125 via a DC or AC power supply bus 123, and operable to produce hydrogen and oxygen using the electric power, and to compress and store the hydrogen and oxygen in a tank 150 and tank 155 respectively. In some embodiments, wind 126 is received through a funnel 110 that is operatively coupled to the generator/turbine 125 to supply wind power. In some embodiments, a startup-assist mechanism 122 is operably coupled to deliver a startup assist to the generator/turbine 125, and optional startup power 160 is coupled to the startup-assist mechanism 122 to provide electrical power for that mechanism. In some embodiments, a wind-speed sensor 120 is operable to generate a speed signal based on a sensed wind speed, and a status controller 140 is coupled to the startup-assist mechanism 122 and is operable to start the generator/turbine 125 based upon the speed signal from the wind-speed sensor 120. In some embodiments, a wind-direction sensor 121 is operable to generate a direction signal based upon a sensed wind direction, a rotation mechanism 130 coupled to point the turbine/electrical generator 125 in a compass direction, and a rotation controller 135 coupled to the rotation mechanism 130 and operable to point the generator based upon the direction signal.

Further disclosed in FIG. 1, is a block diagram of a system 100 showing one embodiment of the present invention having among other things a central processing unit (CPU) 107, connected via various buses 115 to a RAM module 108, a storage controller 106, and an I/O controller 109. The storage controller 106 is operatively connected to various types of physical media via various buses 115. These physical media include CDs, CD-R, CD-RWs, DVD-Rs, or DVDs using one or more optical drives 102, a disk or diskette using one or more floppy drives 103, magnetic tape using one or more tape drives 104, one or more hard drive or magnetic drives 105, and a removable storage media (e.g., a flash memory device) using a Universal Serial Bus (USB) 101. In some embodiments, the removable storage media includes a universal mass storage device, or USB device, that is typically inserted into a USB 101 through which data and/or applications are uploaded and/or downloaded onto the USB device (i.e., a flash memory device such as a key drive, thumb drive or some other flash memory device as is known in the art). (See *USB Complete: Everything You Need to Develop Custom USB Peripherals 2nd Edition*, by Jan Axelson, Lakeview Research, 2001.) In some embodiments, an I/O controller 109 is operatively connected to various I/O devices via various buses 115. In some embodiments, these devices include to a monitor 127, which, in some embodiments, is a CRT, LCD or some other type of display. In some embodiments, a printer 111 is connected to the I/O controller. In some embodiments, these devices additionally include a keyboard, which, in turn, is connected to a mouse. In some embodiments, an Internet 114 is connected to the I/O controller 109 via a modem, Ethernet port, or some other connection known in the art. (See *Embedded Ethernet and Internet Complete*, by Jan Axelson, Lakeview Research, 2003.) In some embodiments, a local area network (LAN), or wide area network (WAN) may be used as apart of an Internet. In some embodiments, a satellite is connected to the I/O controller via a satellite IP modem and/or satellite gateway.

In some embodiments, when information is transferred or provided over a network or another communications connection (e.g., either hardwired, wireless, or a combination of hardwired or wireless) to a computer system, the connection is properly viewed as a computer-readable media. Thus, any such connection is properly termed a computer-readable media. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, or intermediate format instructions such as assembly language, or even source code.

In this description and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or Personal Digital Assistant (PDA)) where internal modules (e.g., a processor and memory) work together to perform operations on electronic data.

In some embodiments, the invention may be practiced in network computing environments with many types of computer system configurations, including hubs, routers, wireless access points (APs), wireless stations, personal computers, laptop computers, hand-held devices, multiprocessor systems, microprocessor-based or programmable consumer electronics, network PCs, minicomputers, mainframe computers, mobile telephones, PDAs, pagers, and the like. The invention can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices.

In some embodiments, Internet refers to a network of networks. Such networks may use a variety of protocols for exchange of information, such as TCP/IP, ATM, SNA, SDI, etc, and may be used within a variety of topologies or structures. The physical connections of the Internet and the protocols and communication procedures of the Internet (e.g., the TCP/IP protocol stack) are well known to those in the art and are collectively referenced herein as the "Transport Layers." The Transport Layers provide such connections using various protocols (TCP/IP and UDP) over private and public network infrastructures, and will be used to define the method of communication between computer systems. Access to the Internet is typically provided by Internet service providers (ISPs). Access to the Internet via a computer system is typically by way of two or more computers connected in a client-server configuration. A client device or client will be used to reference any computer system that a user may sit at, touch, or hold. A server device will be used to refer to a remotely located computing system, which may be accessed by users through a client application or device via a LAN, WAN or Internet. Users on client systems, such as the client computer systems, generally obtain access to the Internet through an ISP. Access to the Internet may facilitate transfer of information (e.g., email, text files, digital-content files, etc.) between two or more computer systems, such as the client computer system and/or a server computer system (see e.g., a web server, mail server or the like).

There have been a variety of different approaches to the problem of low-wind speed occurring during the course of using wind power to generate electricity for an electrolyzer used in the production of hydrogen gas. U.S. Pat. No. 4,184,084 ("Crehore"), which is incorporated by reference, discloses a wind-driven gas generator which converts wind energy into electrical energy so as to form hydrogen gas by electrolysis at wind velocities between four (4) miles per hour (6.4 km/h) to upwards of one hundred (100) miles per hour (160.9 km/h). Crehore does not address the generation of electricity where the wind speed is less than the generation threshold for a particular turbine/electrical generator.

In some embodiments, the present invention addresses the problem of low-wind speed and in particular low-wind speed as it relates to the generation threshold of an electrical generator used to generate electricity for a hydrogen generating electrolyzer. One way to solve this problem is through the use of a blower and/or other startup assist to provide additional kinetic energy to the wind used in generating electrical power. This blower and/or startup assist is powered through one or more batteries that are charged by the electrical generator during periods of moderate to high wind, or, alternatively, it is powered through optional external power sources.

In some embodiments, the blower and/or startup assembly is controlled by a computer. One advantage of using a computer is that, even if the wind speed drops ever so slightly below the generation threshold, the blower and/or startup assist can be used to temporarily compensate (i.e. make up the difference) for the deficiency in wind energy. Thus, for example, if the generation threshold is four (4) miles per hour (6.4 km/h) and the prevailing wind speed is three point eight (3.8) miles per hour (6.1 km/h), the blower and/or startup assist can be used to generate the additional point two (0.2) miles per hour (0.3 km/h) of wind speed to meet the requirements of the generation threshold.

In some embodiments, the present invention provides an apparatus that includes one or more the follow items: a wind-powered electric generator, a battery, a battery-charge controller coupled to the generator to receive electric power and coupled to the battery to deliver electric charge, an electrolyzer coupled to receive electric power from the battery and operable to produce hydrogen using the electric power, a startup-assist mechanism operably coupled to deliver a startup assist to the generator, a wind-speed sensor operable to generate a speed signal based on a sensed wind speed, a status controller coupled to the startup-assist mechanism and operable to start the generator based upon the speed signal, a direction-sensitive wind collector coupled to deliver concentrated wind power to the generator, a wind-direction sensor operable to generate a direction signal based upon a sensed wind direction, a rotation mechanism coupled to point the wind collector in a compass direction, and a rotation controller coupled to the rotation mechanism and operable to point the generator based upon the direction signal.

The magnets and rotors used in a wind-powered electric generator can be made using known techniques, such as those described in U.S. Pat. No. 5,594,289 ("Minato Patent"), incorporated here by reference in its entirety. The Minato Patent discloses a magnetic rotating apparatus to be used in electrical motors, generators. This apparatus uses the field of an electromagnet to turn a series of magnets positioned on two rotors. This electromagnet is supplied with direct electrical current to push or, in some embodiments, pull the magnet containing rotors. This configuration creates less heat that a conventional electric motor that uses rotors containing, wires. The use of magnets instead of wires allows for more inertia to be generated, thus creating a more efficient electrical motor, and generators.

In some embodiments, the battery includes one or more lead-acid battery cells. In other embodiments, the battery includes a solid-state lithium-ion battery. In still other embodiments, the battery includes a metal-hydride battery. In yet other embodiments, the battery includes a lithium-sulfinyl battery. Other embodiments include yet other battery chemistries. Still other embodiments include mechanical storage, for example using one or more flywheels, using water pumped between reservoirs, and/or using hydraulics or other mechanical devices that receive electrical power, store that electrical power as mechanical or potential energy, and regenerate electrical power from the stored energy.

In some embodiments, the present invention includes insulating materials to keep the water utilized by the invention from freezing. These insulating materials may include inorganic glass fibers, plastics, or other insulating materials.

Figure 2:
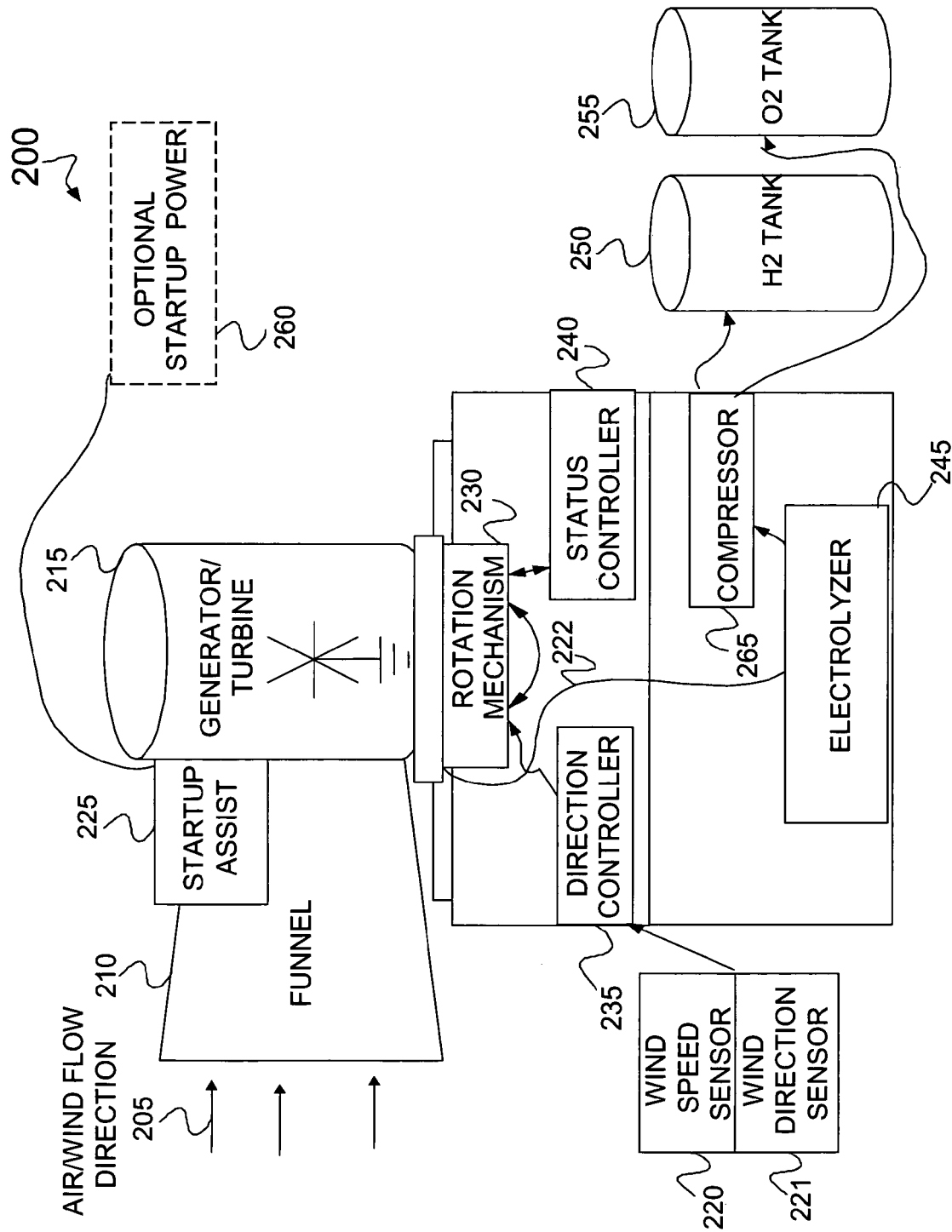
FIG. 2 is a block diagram of a system 200 showing one embodiment of the present invention having among other things a power supply bus (DC or AC) 222, coupled directly to an electrolyzer 245 from a generator/turbine 215, and an optional startup power 260 coupled to the startup assist 225.

FIG. 2 shows a block diagram of system 200, one embodiment of the present invention that includes at least one wind-powered electric generator 215, an electrolyzer 245 coupled to receive electric power from the generator 215 via a DC or AC power supply bus 222, and operable to produce hydrogen and oxygen using the electric power, and a compressor 265 coupled to the electrolyzer 245 used to compress hydrogen and oxygen for purpose of storage in a tank 250 and tank 255 respectively. In some embodiments, wind 205 is received through a funnel 210 that is operatively coupled to the generator/turbine 215 to supply wind power. In some embodiments, a startup-assist mechanism 225 is operably coupled to deliver a startup assist to the generator 215, and optional startup power 260 is coupled to the startup-assist mechanism 225 to provide electrical power for that mechanism. In some embodiments, a wind-speed sensor 220 is operable to generate a speed signal based on a sensed wind speed, and a status controller 240 is coupled to the startup-assist mechanism 225 and is operable to start the generator 215 based upon the speed signal from the wind-speed sensor 220. In some embodiments, a wind-direction sensor 221 is operable to generate a direction signal based upon a sensed wind direction, a rotation mechanism 230 coupled to point the turbine/electrical generator 215 in a compass direction, and a direction controller 235 coupled to the rotation mechanism 230 and operable to point the generator based upon the direction signal.

Figure 3:
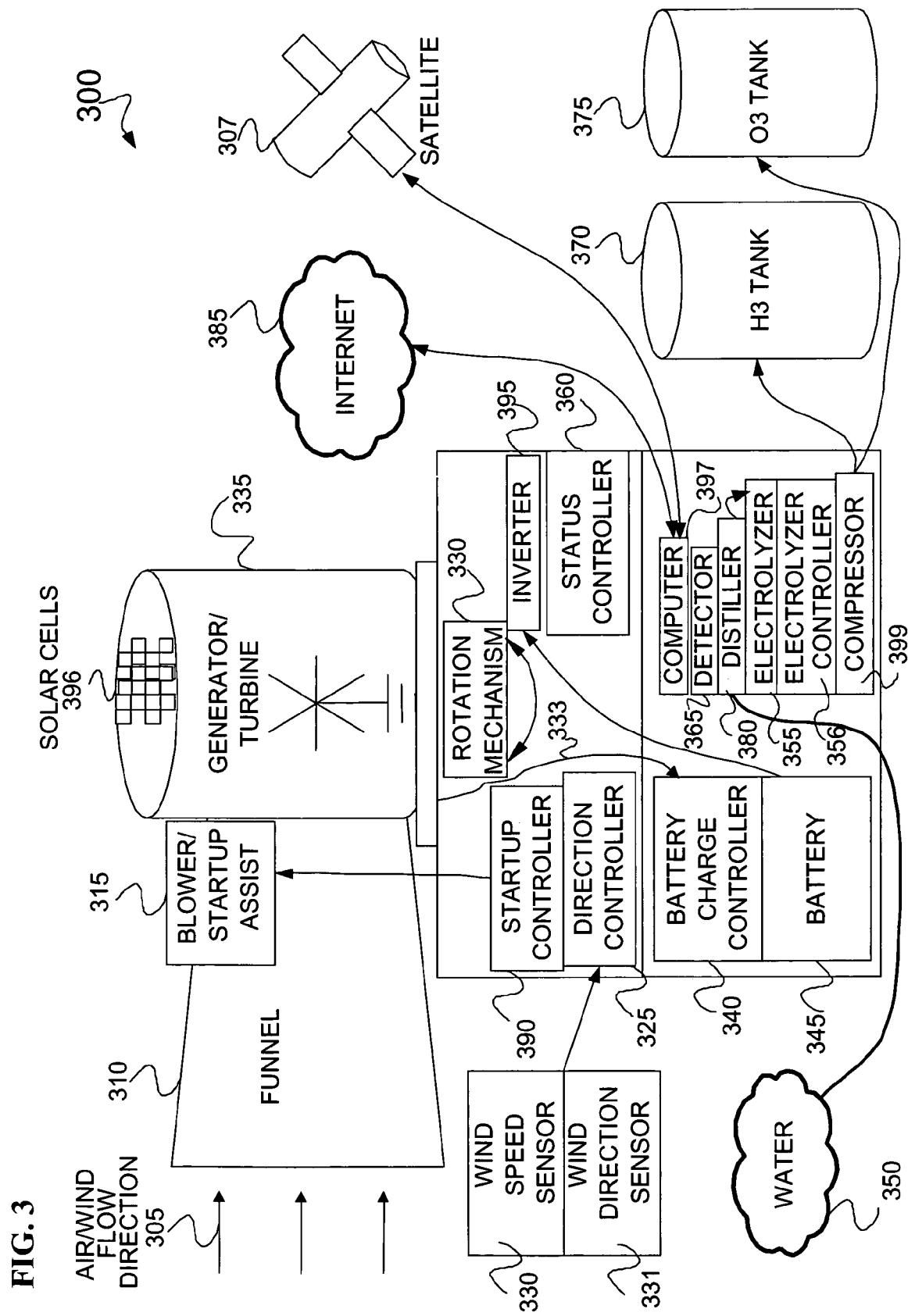
FIG. 3 is a block diagram of a system 300 showing, among other things, one embodiment of the present invention with a power supply bus (AC or DC) 333 coupled to a battery-charge controller 340 and at least one battery 345, and a solar cell 396 coupled to the battery-charge controller 340 to provide direct electrical current.

FIG. 3 is a block diagram of system 300 that illustrates additional embodiments where the apparatus further includes at least one battery 345, a battery-charge controller 340 coupled to the generator 335 to receive electric power and operably coupled to deliver an electric charge to at least one battery 345 via a DC or AC power supply bus 333, wherein the startup-assist mechanism 315 further includes at least one electric-powered blower 315 operatively coupled to receive electric power from the at least one battery 345 via a startup controller 390, and to blow air to assist the generator 335 to start rotating, a detector 365 operable to determine whether an amount of hydrogen in a tank 370 has reached a predetermined value and to generate a fullness signal based thereon, an electrolyzer controller 356 operably coupled to an electrolyzer 355, wherein the electrolyzer controller 356 determines an amount of water remaining in the electrolyzer 355, a distiller 380 operable to receive and distill a liquid (e.g., water) 350, and to produce distilled water therefrom, based upon a signal from the electrolyzer controller 356 that more water is needed, wherein the distilled water is then transported to the electrolyzer 355, and a computer system 397 operable to connect to an internet 385, and based on the fullness signal from a detector 365 to which the computer system 397 is operatively coupled, to transmit on the internet 385 a message indicative of, among other things, the amount of hydrogen. In some embodiments, a computer system 397 is operatively connected to transmit on a satellite 307 a message indicative of the amount of hydrogen. In some embodiments, as discussed below, additional information can be transmitted via an internet 385 and/or satellite 307 data related to the operation of the apparatus 300.

In some embodiments, the apparatus 300 further includes a compressor 399 operatively coupled to the electrolyzer 355 to receive and compress hydrogen gas and oxygen gas for storage into tank 370 and 375 respectively.

In still further embodiments, air/wind flow 305 is used to provide wind power to the generator/turbine 335. The air/wind flow 305 is determined based upon a wind speed sensor 330 and a wind direction sensor 331 which are both operatively coupled to a direction controller 325. This direction controller 325 is, in turn, operatively coupled to a rotation mechanism 330 that assists in rotating the direction of the generator/turbine 335 to allow for wind to flow into the generator/turbine 335. In other embodiments, a status controller 360 is used to determine the status of the apparatus 300.

In some embodiments, a computer system 397 is used to store, control and manipulate data. In some embodiments, data relates to, among other things, battery charge, wind speed, wind direction, orientation of the funnel 310, electricity generated by generator/turbine 335, electricity generated by solar cells 396, pressure in the hydrogen 370 and oxygen 375 tanks, amount of water converted to hydrogen and oxygen gas, and related data is compiled on one or more of the above referenced storage media. In some embodiments, this data is sent over an internet 385 for compilation elsewhere. In some embodiments, this data is transmitted via satellite 307 for compilation elsewhere. In some embodiments, the computer system 397 received data in the form of instructions. In some embodiments, these instructions are to shut off the apparatus. In some embodiments, these instructions are to turn on the apparatus. In still other embodiments, this data relates to adjusting the orientation of the funnel 310 such that more or less wind may be captured. In some embodiments, a computer system 397 is used to implement instructions relating to the below described methods (see FIGS. 4 through 6-6B) and is stored on a computer readable media.

In some embodiments, the computer system 397 contains the following components operatively connected together: a central processing unit (CPU) 107, connected via various buses 115 to a RAM module 108, a storage controller 106, and an I/O controller 109. The storage controller 106 is operatively connected to various types of physical media via various buses 115. These physical media include CDs, CD-R, CD-RWs, DVD-Rs, or DVDs using one or more optical drives 102, a disk or diskette using one or more floppy drives 103, magnetic tape using one or more tape drives 104, one or more hard drive or magnetic drives 105, and a removable storage media (e.g., a flash memory device) using a Universal Serial Bus (USB) 101. In some embodiments, the removable storage media includes a universal mass storage device, or USB device, that is typically inserted into a USB 101 through which data and/or applications are uploaded and/or downloaded onto the USB device (i.e., a flash memory device such as a key drive, thumb drive or some other flash memory device as is known in the art). (See *USB Complete: Everything You Need to Develop Custom USB Peripherals 2nd Edition*, by Jan Axelson, Lakeview Research, 2001.) In some embodiments, an I/O controller 109 is operatively connected to various I/O devices via various buses 115. In some embodiments, these devices include to a monitor 127, which, in some embodiments, is a CRT, LCD or some other type of display. In some embodiments, a printer 111 is connected to the I/O controller. In some embodiments, these devices additionally include a keyboard, which, in turn, is connected to a mouse. In some embodiments, an Internet 114 is connected to the I/O controller 109 via a modem, Ethernet port, or some other connection known in the art. (See *Embedded Ethernet and Internet Complete*, by Jan Axelson, Lakeview Research, 2003.) In some embodiments, a local area network (LAN), or wide area network (WAN) may be used as apart of an Internet. In some embodiments, a satellite is connected to the I/O controller via a satellite IP modem and/or satellite gateway.

FIG. 3A is a block diagram of an apparatus 300 where, in some embodiments, a screen 398 to cover an air inlet for a funnel 310 is installed to protect against foreign objects from entering the funnel 310. In some embodiments, this screen is constructed from aluminum, composites, plastics or steel.

While in the past mechanical compressors were utilized to compress gases such as hydrogen, these types of compressors have a number of drawbacks. Mechanical compressors have parts that tend to wear out due to difficulties in lubrication and the high pressures at which these compressors operate. Additionally, mechanical compressors use relatively large amounts of electrical power to operate. One solution to these drawbacks is the use of a non-mechanical hydrogen compressor.

Non-mechanical hydrogen compressors are a component of the present invention and can be made using known techniques such as those described in U.S. Pat. No. 4,505, 120 ("Golben Patent"), incorporated here by reference in its entirety. The Golben Patent describes a compact, non-mechanical hydrogen compressor. Globen teaches "a hydrogen compressor and compressor system utilizing hydrides that when alternately heated by an electric heater and cooled by water (which can be ordinary tap water), will economically generate high hydrogen pressures at low flow rates." (Col. 1, line 45-50.) The advantage of this compressor is that it provides a continuous, uninterrupted flow of hydrogen using readily available resources for compression such as ordinary tap water.

The hydrogen compressor disclosed by Golben operates in the following manner. Hydrogen from a hydrogen producing process, for example, electrolysis is passed into a vessel containing a hydride. This vessel also contains an electric heating element inserted into the hydride. The vessel is surrounded by a cooling fluid passage capable of having water passed through it. The hydrogen gas is pumped into the hydride, and is initially heated by the element. Next the element is shut off and water is injected into the fluid passages so as to cool the hydrogen containing hydride. Once cooled, the hydrogen gas flows out of the vessel, thus producing a stream of compressed hydrogen at an even, uninterrupted rate.

In some embodiments, the apparatus 300 further includes an inverter 395 operatively coupled to the batteries 345 to convert direct electrical current into alternating electrical current.

In some embodiments, the apparatus 300, further includes a battery-charge controller 340 coupled to the generator/turbine 335 to receive electric power and operably coupled to deliver electric charge to at least one battery 345.

In some embodiments, the apparatus 300 further includes one or more solar-powered photo electric cells 396 operatively coupled to supply electrical power to the battery-charge controller 340.

In some embodiments, the apparatus 300 further includes at least one battery 345 including a lead-acid battery, and the startup-assist mechanism further includes an electric powered blower 315 operatively coupled to receive electric power from the at least one battery 345, and to blow air to assist the generator/turbine 335 to start rotating. Once this generator/turbine 335 begins to rotate, electricity to be used in electrolysis to create hydrogen gas is generated.

Figure 3B:
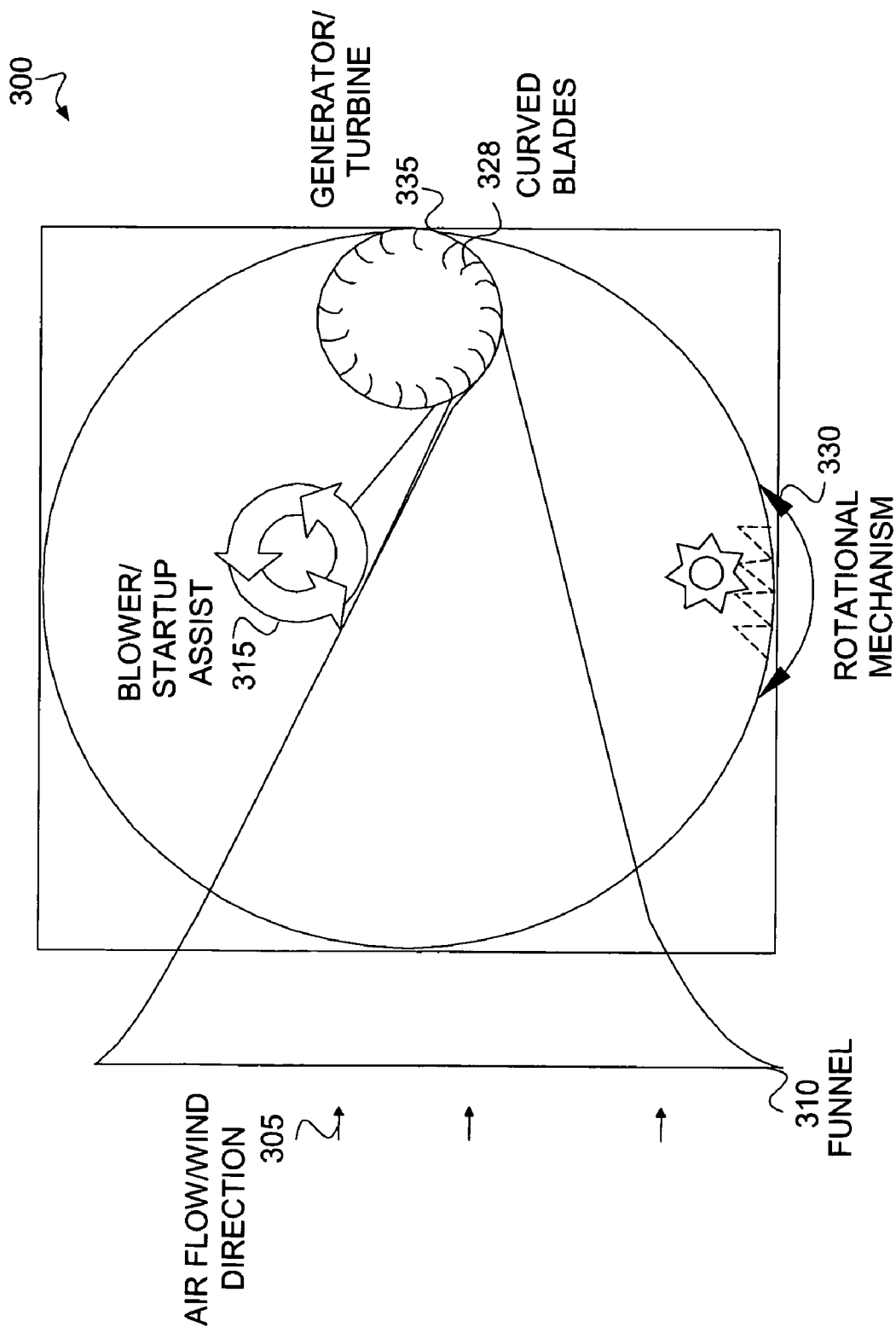
FIG. 3B is a top-down view of a system 300 in the form of a block diagram.

In FIG. 3B, a top-down view of an apparatus 300 is disclosed which, in some embodiments, includes a funnel ~310 operatively connected to a turbine and electricity generating electric generator/turbine 335. This funnel has a rotational direction of three-hundred-and-sixty degrees (360) and may not exceed the three-hundred-and-sixty degree (360) rotation from any starting point. The turbine and electricity generating electric generator/turbine 335 is, in some embodiments, provided assistance through a blower/startup assist 315 that is operatively connected to the turbine and electricity generating electric generator/turbine 335. In some embodiments, the generator/turbine 335 has curved blades 328 that are turned by air flow/wind direction 305.

The principle of using an electrolyzer 355, and electrolysis to generate hydrogen gas from water by passing an electrical current through the water was first proposed by Michael Faraday in 1830s. The process of electrolysis works in the following manner. First, two electrodes, a cathode (a negatively charged electrode) and an anode (a positively charged electrode) are placed into a solution of water. Next an electrical current is passed through the anode to the cathode, forming a circuit. This results in the water molecule being separated. The chemical equation for electrolysis is:

$$\text{energy(electricity)} + 2H_2O \rightarrow O_2 + 2H_2.$$

At the cathode, there is a negative charge created by the electrical current. This means that there is an electrical pressure to push electrons into the water at this end. At the anode, there is a positive charge, so that the electrode would absorb electrons. Water, however, is not a very good conductor. Instead, in order for there to be a flow of charge all the way around the circuit, water molecules near the cathode are split up into a positively charged hydrogen ion ($H^+$), and a negatively charged hydroxide ion ($OH^-$). The separation of the water molecule is:

$$H_2O \rightarrow H^+ + OH^-$$

Once separated, the $H^+$ proton is free to pick up an electron ($e^-$) from the cathode. This donation of electrons by the cathode is symbolized by:

$$H^+ + e^- \rightarrow H$$

Once this hydrogen atom (H) meets another hydrogen atom (H) a hydrogen gas molecule is formed. This creation of this newly formed hydrogen is represented below:

$$H + H \rightarrow H_2$$

The generation of hydrogen gas through electrolysis is a component of the present invention and can be achieved using known techniques, such as those described in U.S. Pat. No. 6,685,821 ("the Kosek et al. Patent"), incorporated here by reference in its entirety. The Kosek et al. Patent describes an electrolysis process to generate hydrogen gas at pressures high enough to fill gas storage tanks.

Figure 4:
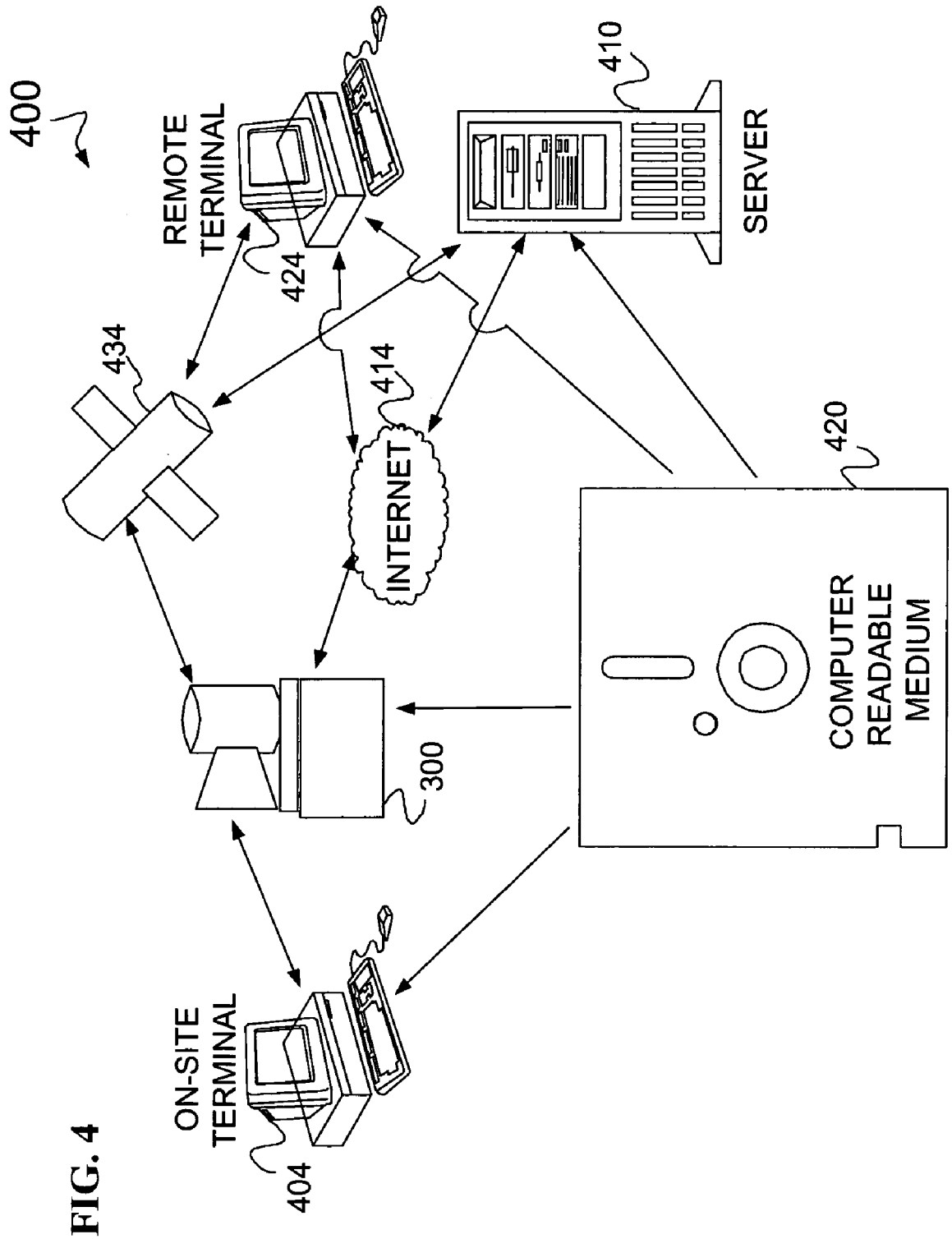
FIG. 4 illustrates a computer readable media method 400, and illustrates the various forms of data I/O for this method.

FIG. 4 is a block diagram of a computer network 400 that includes a computer-readable media 420 used in some embodiments. The computer readable media 420 provides executable instructions stored thereon for causing a suitably programmed information-processing-and-hydrogen-generating apparatus to perform one or more of the methods described below (see FIGS. 5 through 6B). In some embodiments, this computer readable media 420 is executed by a computer system 397 and accompanying storage media located within the apparatus 300; while in other embodiments the computer readable media 420 is executed by and stored on a server 410 located elsewhere, but operative coupled to the apparatus 300 via an internet 414, and/or satellite 434. In some embodiments, the computer system 397 is augmented with an on-site terminal 404 to allow a user to execute the executable instructions using the on-site terminal 404. In some embodiments, a remote terminal 424 is connected to the apparatus 300 via an internet 414 and/or satellite 434, and contains a computer readable media 420 possessing the executable instructions. As described above, this computer readable media containing the below described method of generating hydrogen gas from wind power can be in the form of optical media such as a CD, CD-R, CD-RW, DVD, DVD-R or the like, magnetic media such as flash memory, a hard drive, floppy disk or magnetic tape, or may be implemented in hardware just to name a few.

Figure 5:
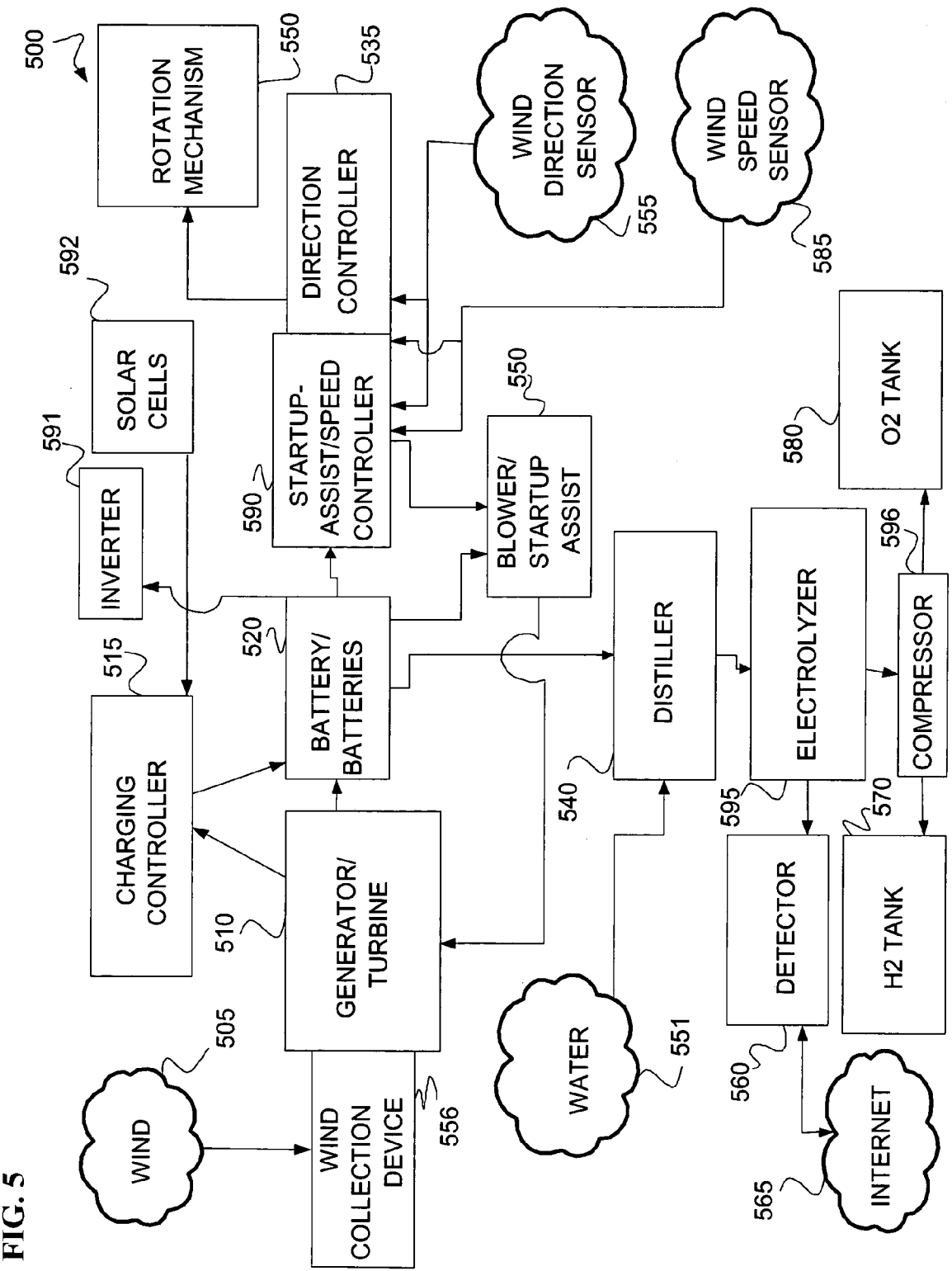
FIG. 5 is a block diagram of a method 500 showing one embodiment of the invention that allows for the generation of hydrogen gas through the use of wind power.

FIG. 5 is a flowchart of a method 500 used in some embodiments that includes receiving wind-direction sensor 555 information into a direction sensor controller 535 and based upon the wind-direction sensor 555 information, generating with the direction controller 535 a direction-control signal: changing an orientation of a wind-collection device 556 based upon the direction-control signal, and generating hydrogen from electric current, the current from a generator/turbine 510 that is rotated by wind power derived from the wind-collection device 556.

In still further embodiments, wind 505 is received into a wind collection device 556 that, in turn, transfers the wind 505 to a generator/turbine 510. The electrical power generated by the generator/turbine 510 is then transferred through a charging controller 515 that regulates the electrical power flowing to the battery/batteries 520.

In some embodiments, the method 500 further includes receiving wind-speed sensor 585 information, based upon the wind-speed sensor 585 information, generating a startup-control signal, and initiating rotation of generator/turbine 510 based upon the startup-control signal.

In some embodiments, method 500 further includes receiving wind-speed information 585 into the direction controller 535, wherein the changing of the orientation is also based upon the wind-speed information obtained from the wind-speed sensor 585, and wherein the changing of the orientation is suppressed below a predetermined wind speed.

In some embodiments, the method 500 additionally includes the generating of hydrogen gas through: distilling a liquid (e.g., water 551) to generate distilled water with a distiller 540, electrolyzing, with an electrolyzer 595, the distilled water to form hydrogen gas and oxygen compressing 596 the hydrogen gas, oxygen, and storing the hydrogen gas and oxygen in tanks 570 and 580 respectively.

In some embodiments, the method 500 further includes utilizing a detector 560 to determine that an amount of hydrogen in the tank 570 has reached a predetermined value, and based on the detected amount, transmitting on an internet 565 a message indicating the detected amount.

In some embodiments, the method 500 further includes receiving wind-speed information into a speed controller 590, based upon the wind-speed information, generating a startup-control signal sent to a startup-assist mechanism 550, initiating rotation of a generator/turbine 510 based upon the startup-assist mechanism 550, and generating electric current by wind power derived from a wind-collection device 556.

In some embodiments, the method 500 further includes receiving wind-direction sensor 555 information, receiving wind-speed sensor 585 information, based upon the wind-direction information 555 and the wind-speed information 585 generating with the direction controller 535 a direction-control signal, and changing an orientation of wind-collection device 556 based upon the direction-control signal. A rotation mechanism 550 is used to adjust the orientation of the wind collection device 556 in order to collect more wind 505.

In some embodiments, the method 500 further includes electro-chemical storing, at least some of the electric power, wherein the initiating of the rotation further includes blowing on the generator/turbine 510 with air pushed by a blower 550 powered from the battery/batteries 520.

In some embodiments, the method 500 further includes converting the direct electrical current stored in the batteries 520 into alternating current, through an inverter 591.

In some embodiments, the method 500 further includes the generation of electrical power through the use of one or more solar-powered photo electric cells 592 and the storage of this electrical power in at least one battery 520.

In some embodiments, the method 500 further includes correcting the orientation of the solar-powered photo electric cells 592 to track the sun and to receive the greatest amount of solar energy. Correcting the orientation involves adjusting the tilt angle (the angle the panel makes from the horizontal) and the aspect angle (the angle the panel makes from North) of the solar-powered photo electric cells 592.

Figure 6:
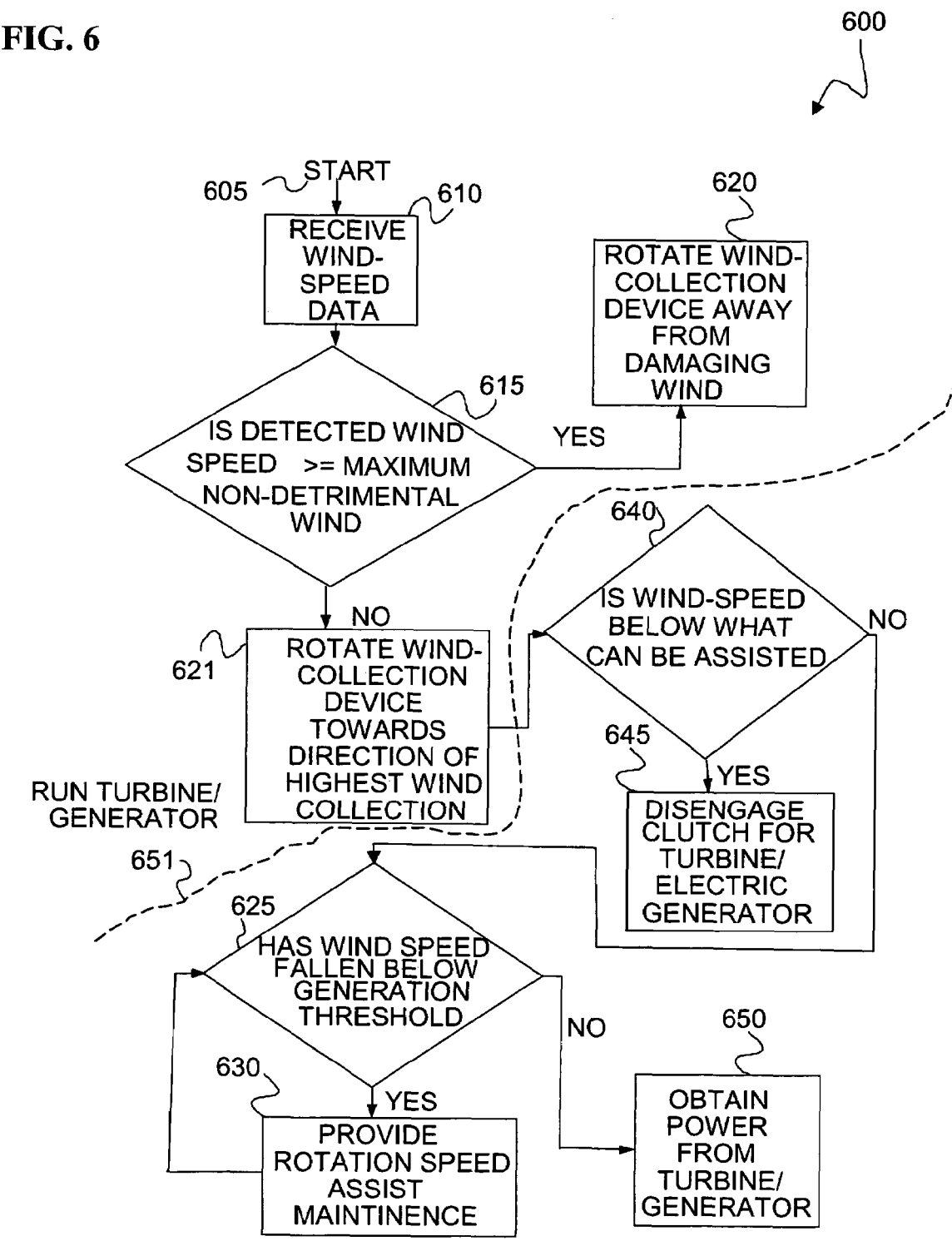
FIG. 6 is a flow chart of method 600 showing one embodiment of the method leading to the running of a turbine/electrical generator 651.

FIG. 6 is a block diagram of a method 600. In at least one embodiment, this method 600 is implemented on one of the above described computer readable media 420. In some embodiments, the method 600 begins with a start 605. From start 605 control is passed to block 610 where wind-speed and direction data is received. Once the wind-speed and direction data is received, control is given to block 615 where the wind-speed data is measured against a maximum non-detrimental wind standard. The maximum non-detrimental wind is that wind speed above which the apparatus will sustain damage. If it is determined that the wind-speed data exceeds or is equal to the maximum non-detrimental wind speed, then control will be passed to block 620 and the wind-collection device will be rotated away from the damaging wind. If, however, it is determined that the wind-speed data does not exceed the maximum non-detrimental wind, then the control will pass to block 621 and the collection device will be rotated towards the direction of the highest wind collection.

In still further embodiments the method 600 contains a run turbine/generator 651 whereby control is conveyed from the block 621 to a block 640 to determine if the wind speed is below what can be assisted. If the wind speed is below what can be assisted, then control is passed to block 645 wherein a clutch for the turbine/electric generator is disengaged. If, in the alternative, the wind speed is above a minimum speed where it can be provided assistance, then control is passed to a block 625 to determine whether the wind speed is below the generation threshold. If the wind speed is below the generation threshold, then control is passed to block 630 and rotation speed assistance maintenance is provided. If, however, the wind speed is not below the generation threshold, then control is passed to block 650 and electrical power is obtained from the turbine/generator.

Figure 6A:
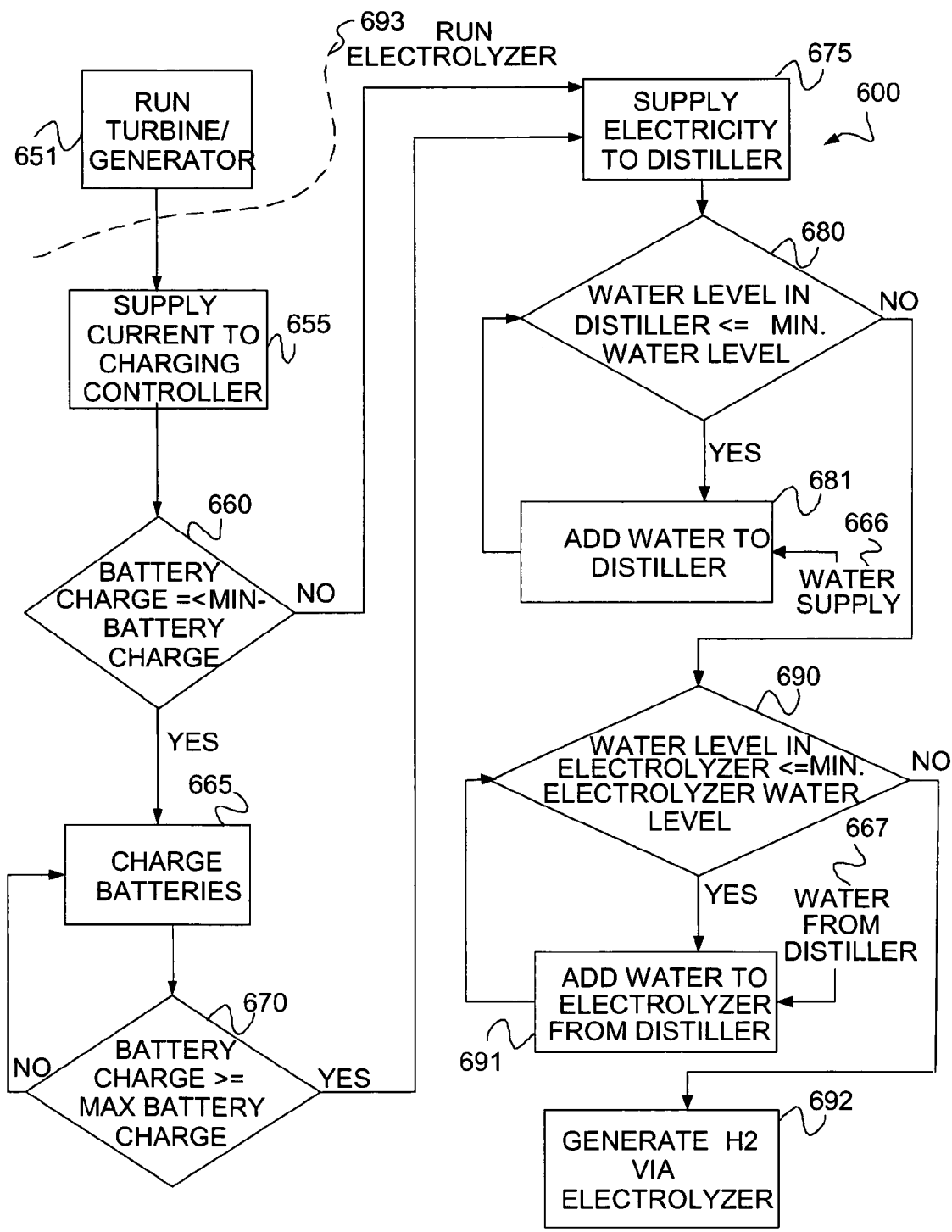
FIG. 6A is a flow chart of method 600 illustrating one embodiment of the method leading to the running of an electrolyzer 693.

FIG. 6A depicts some embodiments of the method 600 where the method 600 contains a run electrolyzer 693 whereby control is transferred from a run turbine/generator block 651 to a block 655 wherein electrical current is supplied to a charging controller. Once electrical current is supplied to the charging controller, control is passed to a block 660 where it is determined whether an existing battery charge is less than or equal to a minimum battery charge. If the existing battery charge is greater than the minimum battery charge, then control is passed to a block 675 wherein electricity is supplied to a distiller. If, in the alternative, the battery charge is less than or equal to the minimum battery charge, then control is passed to a block 665 and the batteries are charged. Once control is passed to the block 665, control is further passed to a block 670 wherein it is determined whether the battery charge is greater than or equal to a maximum battery charge. If the battery charge is less than the maximum battery charge, then control is passed back to the block 665 and the battery charging continues. If, however, the battery charge is greater than or equal to the maximum battery charge, then control is transferred to the block 675 and electricity is supplied to a distiller. Once control is passed to the block 675, then control is further transferred to a block 680 wherein a water level in the distiller is compared against a minimum water level. If the water level in the distiller is less than or equal to the minimum water level, then control is transferred to a block 680 by control block 681 after water is supplied by a water supply 666. In the alternative, if the water level in the distiller is greater than the minimum water level, then control is passed to block 690 and a water level in an electrolyzer is compared against a minimum electrolyzer water level. If the water level in the electrolyzer is less than or equal to the minimum electrolyzer water level, then control is transferred to block 691 and distilled water from the distiller 667 is added to the electrolyzer. If, however, the water level in the electrolyzer is greater than the minimum electrolyzer water level, then control is passed to a block 692 and hydrogen ($H_2$) is generated via the electrolyzer.

Figure 6B:
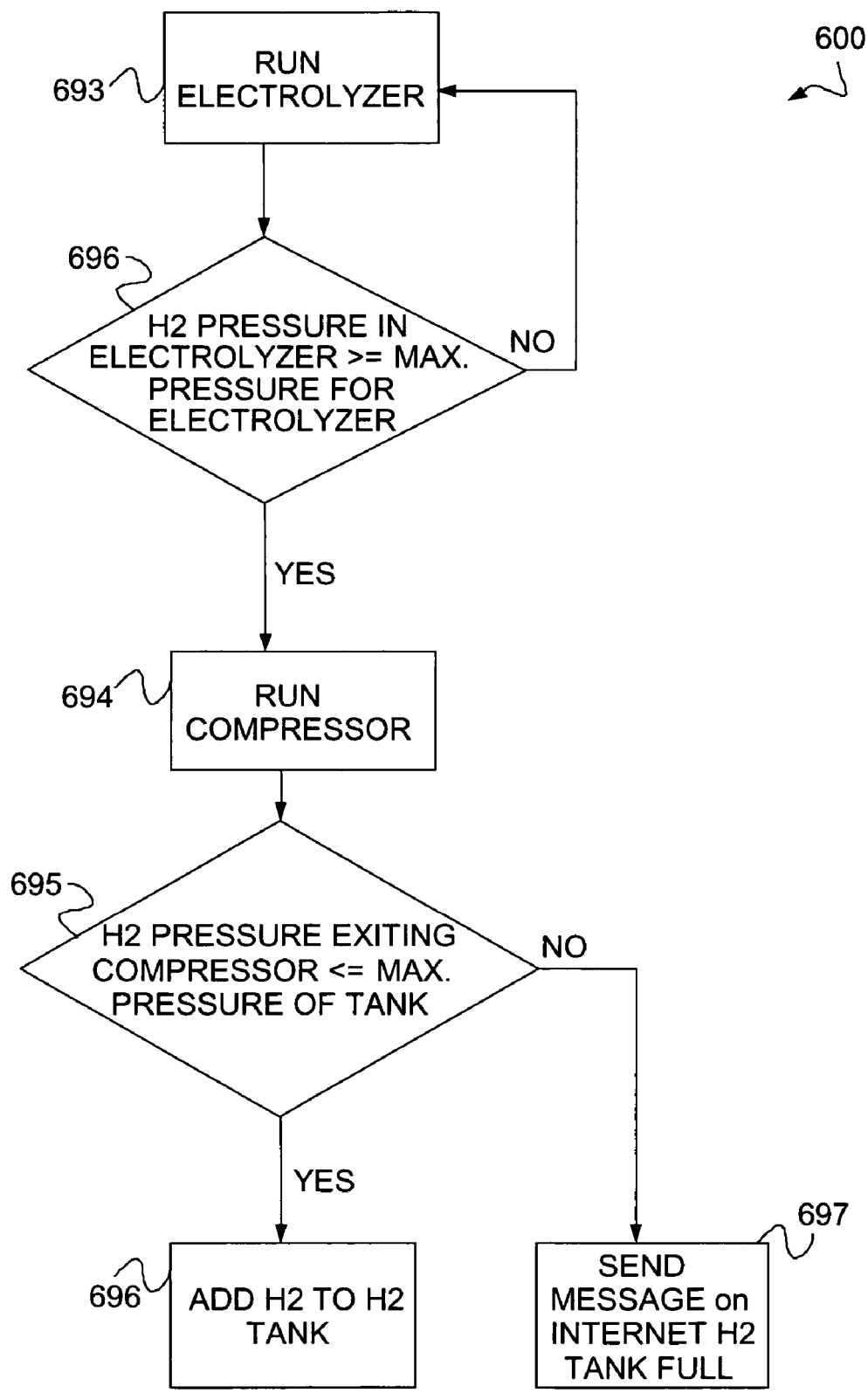
FIG. 6B is a flow chart of method 600 illustrating one embodiment of the method resulting in a storage of hydrogen gas 696, or alternatively the sending of a message on an internet that a tank containing hydrogen gas is full 697.

FIG. 6B discloses some embodiments of the method 600 whereby once the run electrolyzer 693 occurs; control is passed to a block 696 wherein hydrogen pressure in the electrolyzer is compared against a maximum allowable hydrogen pressure for the electrolyzer. If the hydrogen pressure in the electrolyzer is greater than or equal to the maximum allowed hydrogen pressure for the electrolyzer, then control is transferred to block 694 run a compressor. If, however, the hydrogen pressure in the electrolyzer is less than the maximum pressure for the electrolyzer, then control is passed back to the block 693 and the electrolyzer is run again. Once control is passed to block 694 and the compressor is run, then control is transferred to block 695 and the pressure of the hydrogen exiting the compressor is compared against the maximum allowable pressure for a tank containing hydrogen. If the pressure of the hydrogen exiting the compressor is less than or equal to the maximum allowable pressure for the tank of hydrogen, then control is transferred to a block 696 and the hydrogen from the compressor is added to the tank containing hydrogen. Alternatively, if the pressure of the hydrogen exiting the tank is greater than the maximum allowable pressure of hydrogen in the tank, then control is passed to a block 697 and a message is sent on an internet that the tank is full.

Figure 7:
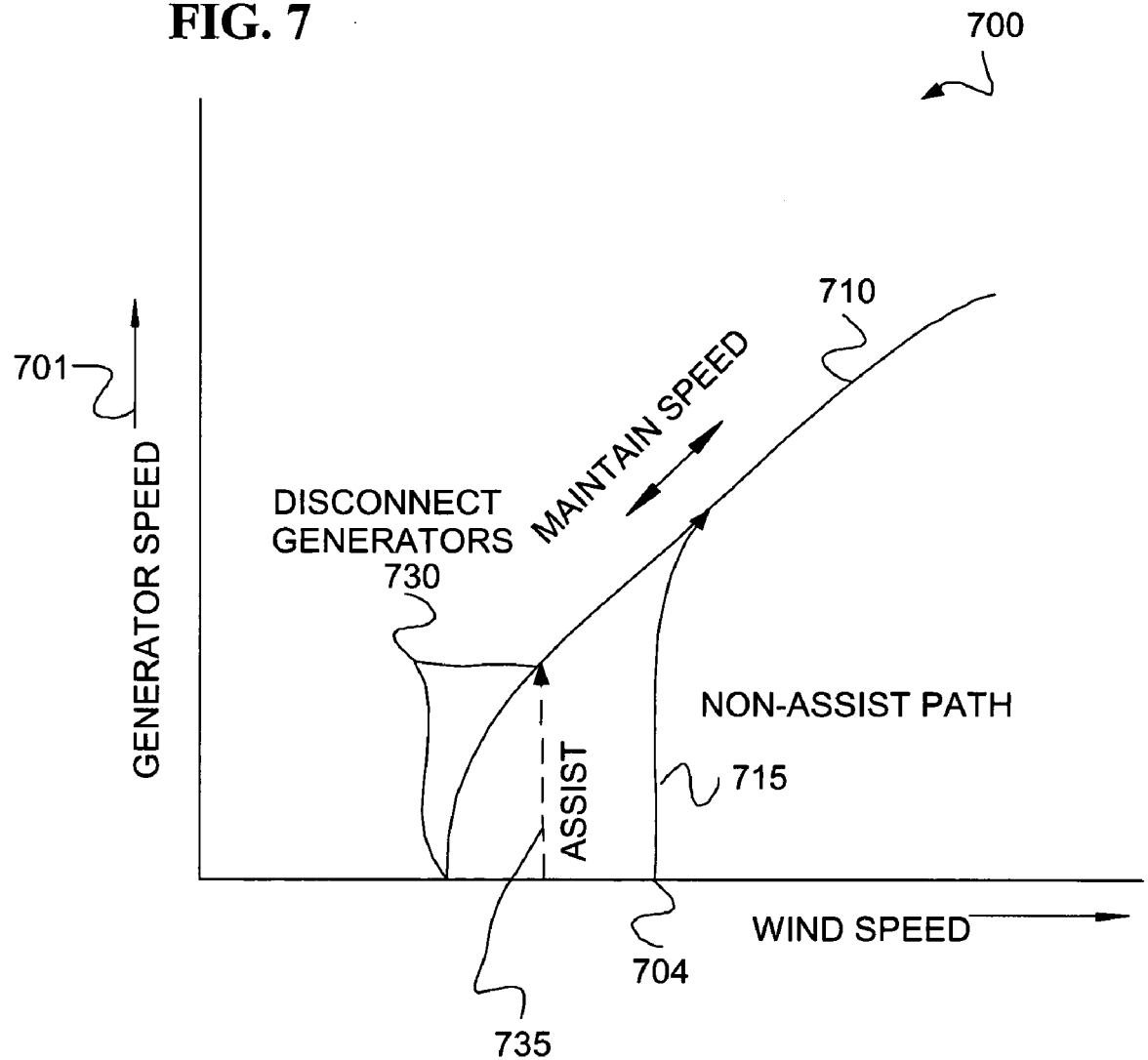
FIG. 7 is a graph 700 comparing wind speed as a function of generator speed, and providing a graphical example of the generation threshold.

FIG. 7 is a graph 700 illustrating the generation threshold at which it would be appropriate to utilize an assist 735. The point labeled disconnect generators 730, denotes a point, in some embodiments, where the wind speed is so low as to negate the benefits of the assist 735. The assist 735 denotes the point where, in some embodiments, wind speed is such that the electric generator/turbine 335 can benefit from the assistance of a blower/startup assist 315. The point where the assist is helpful is described above as the generation threshold. The non-assist path 715 is the point where the generation speed 701 is such that electrical power can be generated without assistance.

FIG. 7A is a graph 700 further illustrating some embodiments whereby wind speed can be understood as a wind speed 702 that is so low as to negate the benefits of any blower/startup assist 315. Additionally, wind speed can be understood as a single wind speed 703 value that is equal to the generation threshold for the blower/startup assist 315. Furthermore, in some embodiments a wind speed 704 may be understood as a wind speed for which no blower/startup assist 315 is necessary.

Figure 7B:
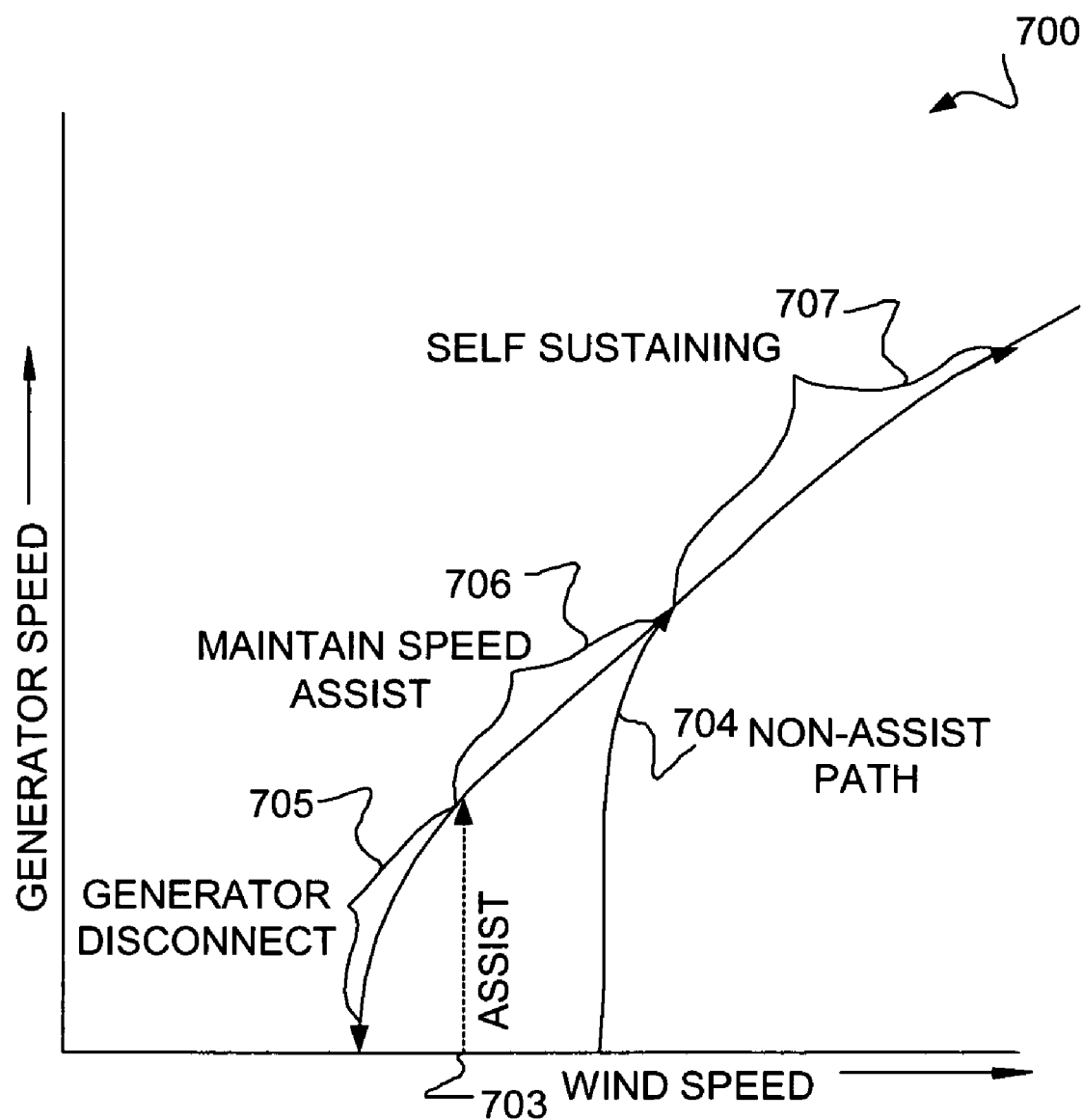
FIG. 7B is an example of graph 700 illustrating, among other things, the range of generation speeds including the point where the turbine/electrical generator 705 is disconnected due to low generator speed.

FIG. 7B is a graph 700 further depicting some embodiments wherein generator/turbine speed is disclosed as three different ranges. First, a generator/turbine disconnect 705 wherein the range of the generator/turbine speed is so low that the generator/turbine 335 is disconnected so as to avoid a startup penalty should it cease rotating. A startup penalty is the cost in terms of wind power or electrical energy of having to initiate rotation of the turbine/electrical generator 335 where the initial generator/turbine speed is zero (0). Second, a maintain speed assist 706 range where the generator/turbine speed is such that the blower/startup assist 315 is needed to increase the generator/turbine speed beyond the generation threshold. A third, self sustaining range 707 where the generator/turbine speed is such that no assistance via a blower/startup assist 315 is necessary.

Figure 7C:
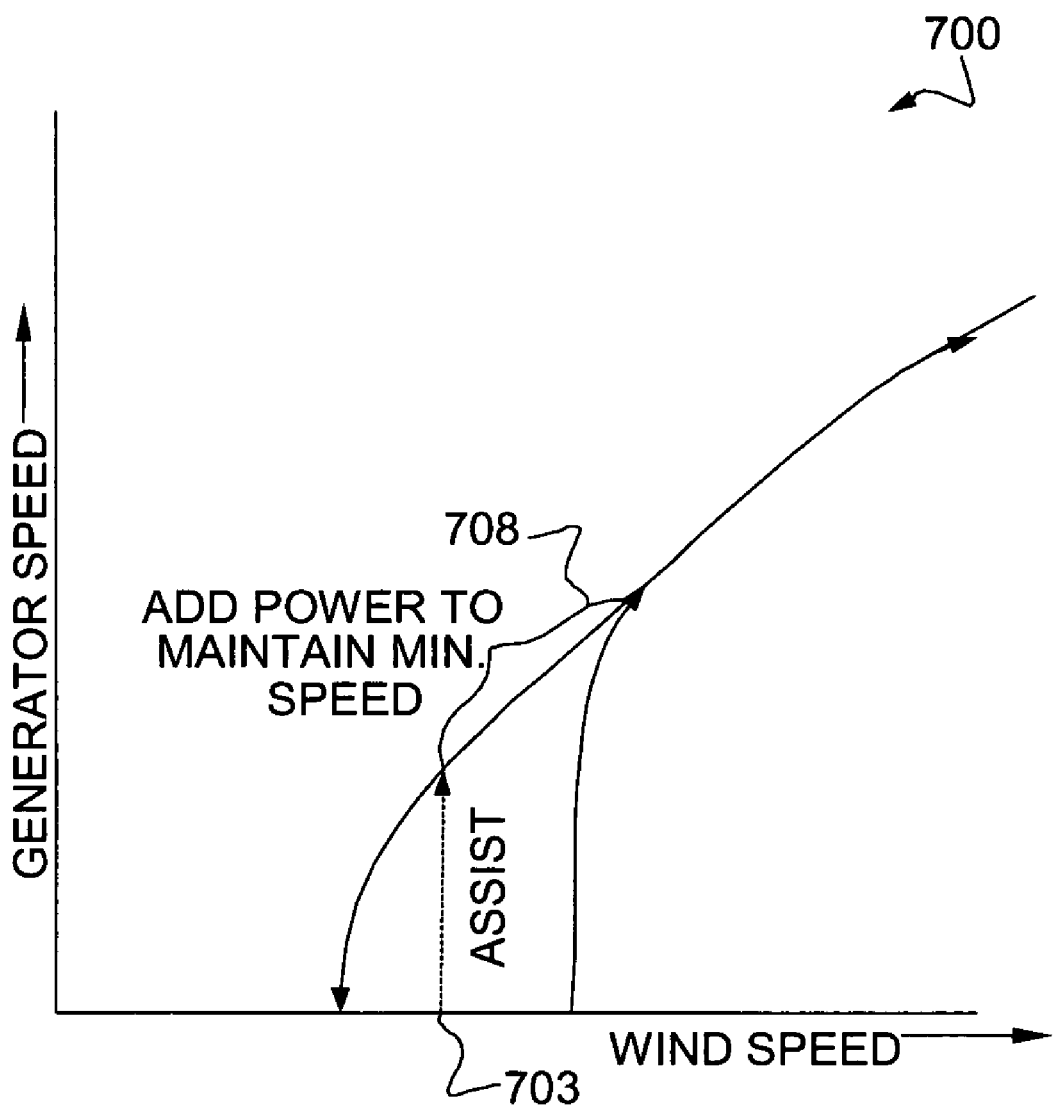
FIG. 7C is an example of the graph 700 depicting a region 708 where additional assistance is needed to turn the turbine/electrical generator 335.

FIG. 7C is a graph 700 further illustrating some embodiments, whereby power must be continually added to the generator/turbine speed to maintain a minimum speed 708 above the generation threshold.

Figure 8:
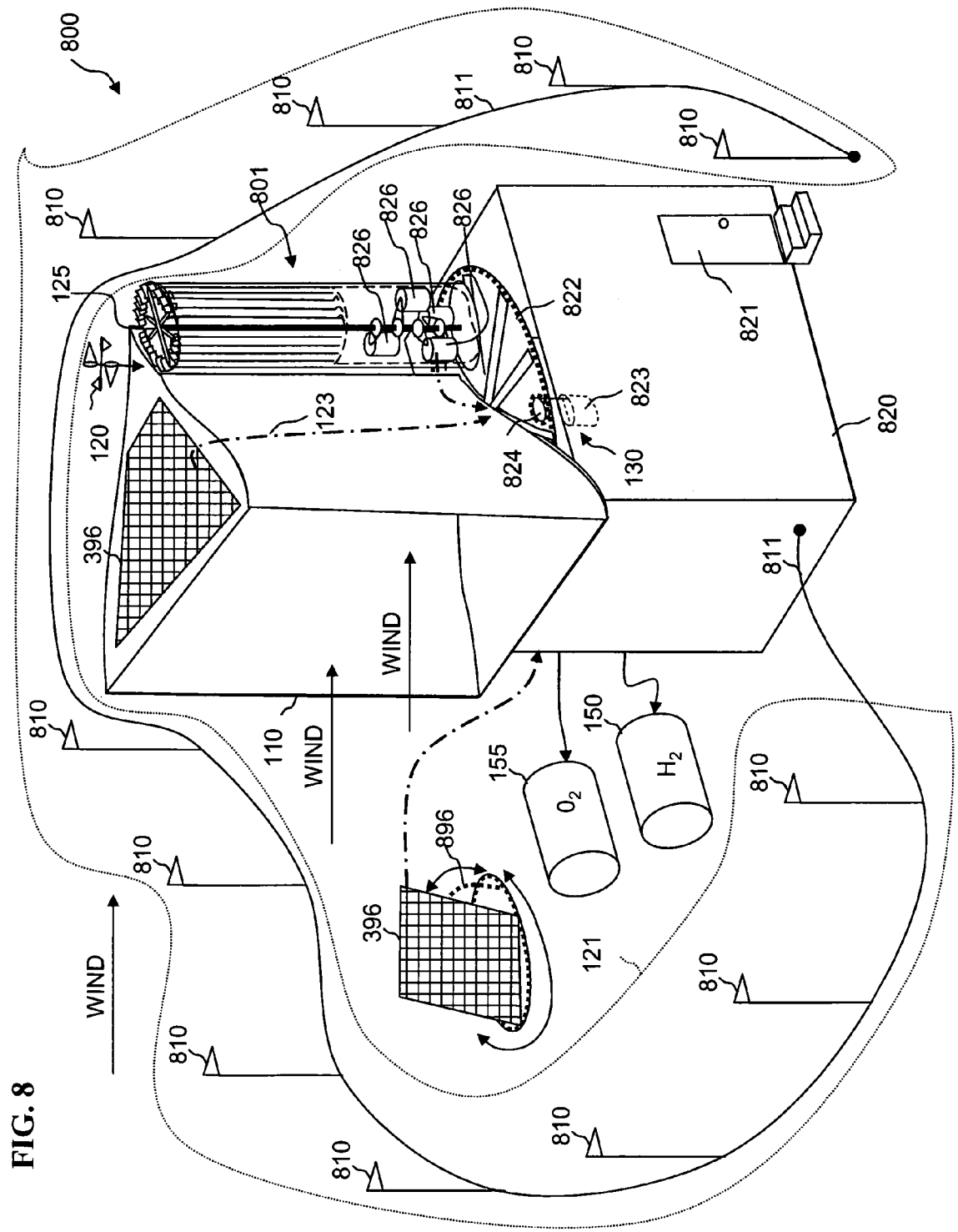
FIG. 8 is an illustration showing the structure of an apparatus 800.

FIG. 8 is an illustration showing the configuration and structure of a wind-powered hydrogen-generating apparatus 800 according to some embodiments of the invention. Apparatus 800 includes a building 820 (e.g., made from concrete blocks, composites, aluminum or steel) having an access door 821 to the inside where the components described above are housed. On top of building 820 is a motor-controlled rotation device 230 that in some embodiments, includes a motor 823 driving a cog 824 that moves a toothed turntable 822. Wind-direction sensor 221 includes a plurality of spaced-apart direction sensors 810 connected by at least one cable 811 to the direction controller 235 described above, which controls motor 823. Direction controller 235 also tracks how far it has turned turntable 822, and will unwind one rotation if it detects that it has gone too far (clockwise, for example) in following the change in wind direction, in order that power and/or signal cables 802 from the exposed rotating apparatus 801 do not get tangled or broken. In some embodiments, turbine/generator 215 includes a squirrel-cage turbine unit having a plurality of curved blades 828 that catch the concentrated wind exiting the down-wind end of funnel 210. In some embodiments, a plurality of generators 826 are mounted within a generator/turbine unit 215, each coupled to a rotating central shaft by belt-and-pulley systems. In some embodiments, the shaft is held in place by bracing to funnel 210. Solar-powered photo-electric cells 396 mounted on funnel 210 and/or on a sun-tracking rotation system 896 at a distance from building 820 to have an unobstructed view of the sun provide additional energy to provide supplemental start-up energy to one or more batteries 345, used to start turbine 215 rotating if wind starts blowing.

In some embodiments, the media contains instructions for causing the method to further include: receiving wind-speed information, based upon the wind-speed information, generating a startup-control signal, and initiating rotation of the generator/turbine based upon the startup-control signal.

In some embodiments, the media contains instructions for causing the method to further include: receiving wind-speed information, wherein the changing of the orientation is also based upon the wind-speed information, and wherein the changing of the orientation is suppressed below a predetermined wind speed.

In some embodiments, the media contains instructions for causing the method to further include: distilling a liquid to generate distilled water, electrolyzing the distilled water to form hydrogen gas, and storing the hydrogen gas in a tank.

In some embodiments, the media contains instructions for causing the method to further include: detecting that an amount of hydrogen in the tank has reached a predetermined value, and based on the detecting of the amount, transmitting on an internet a message indicative of the amount of hydrogen.

In some embodiments, the media contains instructions for causing the method to further include: using one or more photo-electric solar cells to track the sun, by changing the orientation of the one or more photo-electric solar cells.

In some embodiments, the media contains instructions for causing the method to further include: detecting that the apparatus has been tampered with and sending a message on the internet to a computer suitably programmed to receive the message.

In some embodiments, the apparatus, further includes a sensor that determines wind-speed information, and means for initiating rotation of the generator/turbine based upon the wind-speed information.

In some embodiments, the apparatus, further includes the means for changing the orientation is also operative, based upon the wind-speed information, and to suppress changing the orientation when a detected wind speed is below a predetermined wind speed.

In some embodiments, the apparatus further includes the means for storing hydrogen gas in a tank using a compressor.

In some embodiments, the apparatus further includes the means for converting direct electrical current into alternating electrical current.

In some embodiments, the apparatus further includes the means for converting solar energy into electrical energy through the use of one or more solar-powered photo electric cells.

In some embodiments, a kit containing components for the apparatus. The kit includes, in some embodiments, a funnel, a blower/startup assist, one or more solar-powered photo electric cells, a generator/turbine, a rotation mechanism, a connection to an internet, a wind speed and a wind direction sensor, a startup controller, a rotation controller, an inverter, a status controller, a battery charge controller, one or more batteries, a detector, a distiller, an electrolyzer and electrolyzer controller, a compressor and a tank to hold hydrogen gas, and a tank to hold oxygen gas. In addition to these components, in at least one embodiment, the parts needed to assemble these components would also be included in the kit. In some embodiments, these parts include screws, bolts, tape, electrical wire, fastener, and clasps.

Such kits are useful where the apparatus is to be utilized at undeveloped, remote or isolated locations where the ability to individually transport the components of the apparatus is limited or uneconomical.

Some embodiments of the present invention are drawn to an apparatus including: at least one wind-powered electric generator, an electrolyzer coupled to receive electric power from the generator/turbine and operable to produce hydrogen using the electric power, a startup-assist mechanism operably coupled to deliver a startup assist to the generator, a wind-speed sensor operable to generate a speed signal based on a sensed wind speed, a status controller coupled to the startup-assist mechanism and operable to start the generator/turbine based upon the speed signal, a wind-direction sensor operable to generate a direction signal based upon a sensed wind direction, a rotation mechanism coupled to point the generator/turbine in a compass direction, and a rotation controller coupled to the rotation mechanism and operable to point the generator/turbine based upon the direction signal.

In addition to the above disclosed apparatus, some embodiments of the present invention provide a method whereby wind-direction information is received into a direction controller, based upon the wind-direction information, generating with the direction controller a direction-control signal, changing an orientation of a wind-collection device based upon the direction-control signal, and generating hydrogen from electric current, the current from a generator/turbine that is rotated by wind power derived from the wind-collection device.

Further, in some embodiments the present invention provides a computer-readable media having executable instructions stored thereon for causing a suitably programmed information-processing-and-hydrogen-generating apparatus to perform a method that includes: receiving wind-direction information, based upon the wind-direction information, generating a direction-control signal, changing an orientation of a wind-collection device based upon the direction-control signal, and generating hydrogen from electric current, the current from a generator/turbine that is rotated by wind power derived from the wind-collection device.

In still further embodiments, a kit is available from which to build an apparatus. This kit includes: a funnel component, a blower/startup assist component, solar-powered photo electric cells component, a generator/turbine component, a rotation mechanism component, a connection to an internet component, a wind speed sensor component, a wind direction sensor component, a startup controller component, a rotation controller component, an inverter component, a status controller component, a battery charge controller component, one or more batteries component, a detector component, a distiller component, an electrolyzer component, an electrolyzer controller component, a compressor component, a tank component to hold hydrogen gas, and a tank component to hold oxygen gas. In some embodiments, the kit further includes parts necessary to assemble the components of the kit.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
   at least one wind-powered electric generator;
   an electrolyzer coupled to receive electric power from the generator and operable to produce hydrogen using the electric power;
   a startup-assist mechanism operably coupled to deliver a startup assist to the generator;
   an optional startup power supply coupled to the startup-assist mechanism to provide power for the startup-assist mechanism;
   a wind-speed sensor operable to generate a speed signal based on a sensed wind speed;
   a status controller coupled to the startup-assist mechanism and operable to start the generator based upon the speed signal;
   a wind-direction sensor operable to generate a direction signal based upon a sensed wind direction;
   a rotation mechanism coupled to point the generator in a compass direction; and
   a rotation controller coupled to the rotation mechanism and operable to point the generator based upon the direction signal.

2. The apparatus of claim 1, further comprising:
   at least one battery;
   a battery-charge controller coupled to the generator to receive electric power and operably coupled to deliver electric charge to at least one battery;
   an optional screen covering an air inlet for a wind-collection device;
   wherein the startup-assist mechanism further includes at least one electric-powered blower operatively coupled to receive electric power from the at least one battery, and to blow air to assist the generator to start rotating;
   a detector operable to determine whether an amount of hydrogen in a tank has reached a predetermined value and to generate a fullness signal based thereon;
   an electrolyzer controller operable coupled to the electrolyzer, wherein the electrolyzer controller determines an amount of water remaining in the electrolyzer;
   a compressor operatively coupled to the electrolyzer;

a distiller operable to receive and distill a liquid, and to produce distilled water therefrom, based upon a signal from the electrolyzer controller that more water is needed, wherein the distilled water is then transported to the electrolyzer;

a computer operably coupled to the detector, and based on the fullness signal from the detector, to transmit on an internet a message indicative of the amount of hydrogen; and insulating materials to protect the liquid from freezing.

3. The apparatus of claim 1, further comprising:
a battery-charge controller coupled to the generator to receive electric power and operably coupled to deliver electric charge to at least one battery.

4. The apparatus of claim 1, further comprising the at least one battery.

5. The apparatus of claim 1, further comprising a plurality of batteries.

6. The apparatus of claim 4, wherein the at least one battery includes a lead-acid battery.

7. The apparatus of claim 2, further comprising an inverter operatively coupled to the at least one battery wherein the direct current of the battery is converted into alternating current.

8. The apparatus of claim 2, further comprising one or more solar-powered photo-electric cells operatively coupled to the battery charge controller, where to the battery charge control receives electrical current from the one or more solar-powered photo electric cells.

9. The apparatus of claim 1, further comprising:
an electrolyzer controller operably coupled to the electrolyzer, wherein the electrolyzer controller determines an amount of water remaining in the electrolyzer; and a distiller operable to receive and distill a liquid, and to produce distilled water there from, based upon a signal from the electrolyzer controller that more water is needed, wherein the distilled water is then transported to the electrolyzer.

10. A method comprising:
receiving wind-direction information into a direction controller;

based upon the wind-direction information, generating with the direction controller a direction-control signal:

changing an orientation of a wind-collection device based upon the direction-control signal;

generating hydrogen from electric current, the current from a generator that is rotated by wind power derived from the wind-collection device;

receiving wind-speed information into a speed controller;

based upon the wind-speed information, generating with the speed controller a startup-control signal; and initiating rotation of the generator based upon the startup-control signal.

11. The method of claim 10, further comprising:
receiving wind-speed information into the direction controller; and wherein the changing of the orientation is also based upon the wind-speed information, and wherein the changing of the orientation is suppressed below a predetermined wind speed.

12. The method of claim 10, further comprising:
distilling a liquid to generate distilled water;
electrolyzing the distilled water to form hydrogen gas;
compressing the hydrogen gas; and
storing the hydrogen gas in a tank.

13. The method of claim 12, further comprising:
detecting that the amount of hydrogen gas in the tank has reached a predetermined value; and based on the detecting of the amount, transmitting on an internet a message indicative of the amount of hydrogen gas.

14. The method of claim 10, further comprising:
storing in an electro-chemical battery, at least some of the electric current, wherein an initiation of the rotation by wind power further includes blowing on the generator with air pushed by a blower powered from the electro-chemical battery.

15. The method of claim 14, further comprising:
adjusting an orientation of one or more solar-powered photo-electric cells to track solar energy;

collecting the solar energy through the use of the one or more solar-powered photo-electric cells;

converting the solar energy into a direct electrical current; and storing this direct electrical current into the electro-chemical battery.

16. An apparatus comprising:
a direction sensor that determines wind-direction information;

means for concentrating wind having an air inlet that is larger than an air outlet in order that wind can be collected and concentrated;

means, coupled to the direction sensor, for changing a compass orientation of the wind-concentrating means based upon the wind-direction information;

a wind-powered electric generator positioned to receive the concentrated air; and a hydrogen generator coupled to generate hydrogen from electric current, the current from the generator.

17. The apparatus of claim 16, further comprising:
a sensor that determines wind-speed information; and
means for initiating rotation of the generator based upon the wind-speed information.

18. The apparatus of claim 16, further comprising:
wherein the means for changing the compass orientation is also operative, based upon the wind-speed information, and to suppress changing the compass orientation when a detected wind speed is below a predetermined wind speed.

19. The apparatus of claim 16, further comprising:
a distiller operative to distill a liquid to generate distilled water, wherein the hydrogen generator electrolyzes the distilled water to form hydrogen gas;

a tank operatively coupled to receive and store the hydrogen gas;

a means for compressing the hydrogen gas for storage into a tank;

a sensor that determines wind-speed information; and
means for initiating rotation of the wind-power electric generator based upon the wind-speed information.

20. The apparatus of claim 16, further comprising:
a plurality of batteries;
a battery-charge controller coupled to the wind powered electric generator to receive electric power and operably coupled to deliver electric charge to the plurality of batteries;

a plurality of solar-powered photo electric cells operative couple to the battery-charge controller to deliver direct electrical current to the battery-charge controller;

means for initiating rotation of the wind powered electric generator based on a wind speed;
a detector operable to determine whether an amount of hydrogen in the tank has reached a predetermined value and to generate a fullness signal based thereon;
an electrolyzer controller operable coupled to an electrolyzer, wherein the electrolyzer controller determines an amount of water remaining in the electrolyzer;
a distiller operable to receive and distill a liquid, and to produce distilled water therefrom, based upon a signal from the electrolyzer controller that more water is needed, wherein the distilled water is then transported to the electrolyzer;
a means to convert a direct electrical charge of the plurality of batteries into alternating current; and
a computer operable to connect to an internet, and based on the fullness signal, to transmit on the internet a message indicative of the amount of hydrogen gas.

* * * * *